US009566944B2

(12) United States Patent
Tsogbe et al.

(10) Patent No.: US 9,566,944 B2
(45) Date of Patent: Feb. 14, 2017

(54) FUEL ANTI-THEFT PROTECTION SYSTEMS, APPARATUS, AND METHODS

(71) Applicant: Nuve, Inc., Austin, TX (US)

(72) Inventors: Elom Tsogbe, Austin, TX (US); Antonio Arocha, Austin, TX (US)

(*) Notice: Subject to any disclaimer, the term of this patent is extended or adjusted under 35 U.S.C. 154(b) by 0 days.

(21) Appl. No.: 14/785,512

(22) PCT Filed: Sep. 9, 2014

(86) PCT No.: PCT/US2014/054796
§ 371 (c)(1),
(2) Date: Oct. 19, 2015

(87) PCT Pub. No.: WO2015/047724
PCT Pub. Date: Apr. 2, 2015

(65) Prior Publication Data
US 2016/0068136 A1    Mar. 10, 2016

Related U.S. Application Data

(60) Provisional application No. 61/883,431, filed on Sep. 27, 2013.

(51) Int. Cl.
*B60R 25/10* (2013.01)
*B60K 15/04* (2006.01)
*B60K 15/03* (2006.01)

(52) U.S. Cl.
CPC .............. *B60R 25/10* (2013.01); *B60K 15/03* (2013.01); *B60K 15/0403* (2013.01);
(Continued)

(58) Field of Classification Search
CPC ...... B60R 25/10; B60K 15/03; B60K 15/0403
(Continued)

(56) References Cited

U.S. PATENT DOCUMENTS 5,303,842 A * 4/1994 Harp ................... B60K 15/04
220/562
2006/0111851 A1* 5/2006 Potgieter ............. G01F 23/0076
702/35

(Continued)

OTHER PUBLICATIONS

International Search Report/Written Opinion Regarding PCT Appliation No. PCT/US14/54796, Dated Dec. 23, 2014.

*Primary Examiner* — Kerri McNally
(74) *Attorney, Agent, or Firm* — The Villhard Patent Group

(57) ABSTRACT

Fuel anti-theft systems, apparatus, and methods. Embodiments provide fuel anti-theft systems including a circuit and sensors which define nominal (secure) and tampered-with states. The tampered-with states are indicative of the sensor(s) being absent. Controllers of the current embodiment, moreover, senses a combined state of (all of a pre-selected number of) the sensors and determines therefrom whether all of the sensors are present and secure. In some embodiments, the controller senses the sensors (which can be wired in parallel) via a vehicle chassis ground. If desired, a resistor (which is about electrically equivalent to one of the sensors) and/or a geo-positioning system can be connected to the controller. The sensors can include normally open switches and clamps, cable ties, adhesives, etc. which close the switches. Some sensors include grounding straps while others include ground return leads. In some embodiments, sensors are positioned at vehicle fuel caps and/or fuel filters.

20 Claims, 18 Drawing Sheets

(52) U.S. Cl.
CPC ............... *B60K 2015/0321* (2013.01); *B60K 2015/03197* (2013.01); *B60K 2015/03434* (2013.01)

(58) Field of Classification Search
USPC .................................................... 340/426.24
See application file for complete search history.

(56) References Cited

U.S. PATENT DOCUMENTS

| | | | |
|---|---|---|---|
| 2008/0128453 A1* | 6/2008 | Burckholter | B67D 7/34 222/75 |
| 2010/0090855 A1* | 4/2010 | Wolf | B67D 7/22 340/686.6 |

* cited by examiner

FIG. 1
(Cont'd)
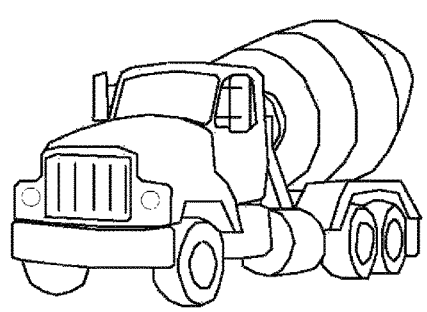
102
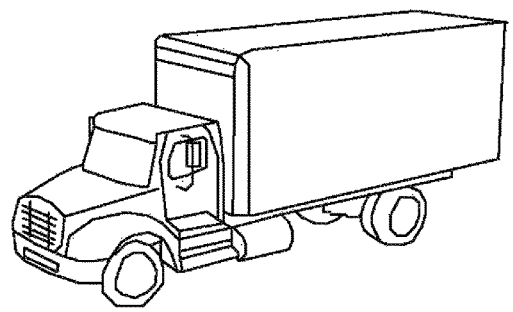
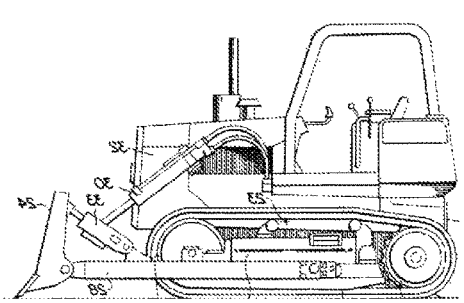
106
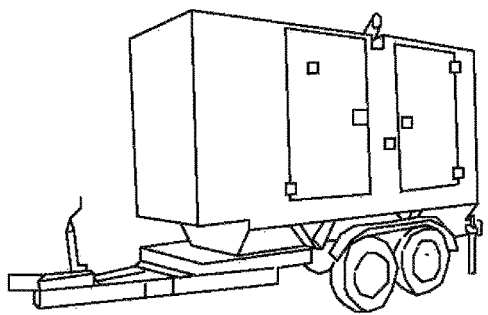
108
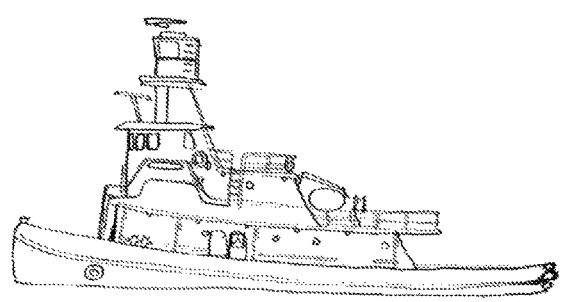
110

CONTROL UNIT

CLAMP SENSOR

GPS UNIT

SENSOR WITH
CONNECTOR

STATIONARY
SENSOR

SENSER INSTALLED ON FUEL CAP

SENSOR INSTALLED ON FUEL FILTER

US 9,566,944 B2

FUEL ANTI-THEFT PROTECTION SYSTEMS, APPARATUS, AND METHODS

CROSS REFERENCE TO RELATED APPLICATIONS

This application claims priority to and is national stage application of PCT application NO. PCT/US2014/54796 titled FUEL ANTI-THEFT SYSTEMS, APPARATUS, AND METHODS, filed by Elom Tsogbe on Sep. 9, 2014 which claims priority to U.S. provisional patent application No. 61/883,431 titled FUEL ANTI-THEFT SYSTEMS, APPARATUS, AND METHODS, filed by Elom Tsogbe on Sep. 27, 2013 the entirety of both of which are incorporated herein as if set forth in full.

BACKGROUND

Theft of gasoline, diesel fuel, and/or other vehicular fuels represents a substantial loss to cargo carriers in many parts of the world. Notably, in many developing countries, fuel represents an easily sold commodity that cannot be traced and which garners a high return in the black market. Thus, parked vehicles stand as undefended targets for fuel thieves. Even attended vehicles, though, can be at risk particularly if the driver is "on the make."

Of course, the fuel contained in these vehicles can be accessed via the fuel fill cap (or simply "fuel cap"). A thief can remove the fuel cap, route a tube or hose through the adjoining fill tube, and siphon fuel from the tank. Moreover, vehicular fuel systems typically present a number of less conventional "entry points" through which a thief can access the fuel contained therein. More specifically, typical vehicular fuel systems include a fuel tank (sometimes with a drain fixture/feature), a fuel pump (often submerged, but sometimes external to the tank), a fuel filter, various valves, a recirculation line, test ports, flow rate sensors, and/or a connection to a carburetor (in older vehicles), or the fuel injectors (in most late model vehicles), and/or a fuel "rail" which feeds the fuel injectors. That list, by the way, is not exclusive but serves to illustrate that each system component has at least one mechanical/fluid coupling that can be tampered with to access the fuel. Additionally, there might be some such fluid couplings between otherwise separate tubes, pipes, hoses, etc. which convey fuel through the vehicle. All of these couplings, components, etc. represent fuel system "entry points" and render the fuel therein subject to theft.

Such risks, moreover, do not exist with land-based vehicles alone. Rather the cars, trucks, lorries, vans, etc. which exist on the roads represent just one category of susceptible vehicle. Aircraft (for instance, helicopters, prop-driven planes, jet planes, etc.), marine vehicles (for instance, boats, hovercraft, tugboats, crane boats, etc.) and other categories of vehicles also stand at risk of fuel-theft. Aviation fuel (av-gas, jet A, mogas) which sells at a premium compared to even automobile gasoline, not to mention diesel represents a particularly "rich" target at unguarded airports, airfields, and the like. Of course, elevated prices and/or scarcity (whether local, regional, or otherwise) aggravate the threat.

SUMMARY

The following presents a simplified summary in order to provide an understanding of some aspects of the disclosed subject matter. This summary is not an extensive overview of the disclosed subject matter, and is not intended to identify key/critical elements or to delineate the scope of such subject matter. A purpose of the summary is to present some concepts in a simplified form as a prelude to the more detailed disclosure that is presented herein. The current disclosure provides systems, apparatus, methods, etc. for detecting potential fuel theft and more particularly for detecting fuel theft related events associated with vehicles such as planes, boats, automobiles, and trucks among other vehicles.

Some embodiments provide fuel anti-theft systems for vehicles which possess fuel systems defining a plurality of fluid entry points. Systems of the current embodiment nominally include a pre-selected number of sensors which are positioned at the entry points. Each sensor defines a nominal/secure state and a potentially tampered-with state. The potentially tampered-with state is indicative of the sensor being absent. The actual states of the sensors combining to create an actual combined state of the sensors. In contrast, the nominal states of the pre-selected number of sensors combine to create a nominal combined state of the pre-selected number of sensors. Furthermore, a controller of the system senses the actual combined state of the sensors and determines whether the actual combined state of the sensors is the nominal combined state of the pre-selected number of sensors. Responsive thereto, the controller generates a signal which indicates whether all of the pre-selected number of sensors are present and un-tampered-with.

In accordance with various embodiments, the current disclosure also provides fuel anti-theft methods. Some such methods comprise a variety of activities including sensing a combined signal from a plurality of sensors positioned at entry points of a vehicle fuel system. Each sensor defines a secure state and a suspect state (indicative of the sensor being absent) in accordance with the current embodiment. Moreover, the secure sensor states of a number of the sensors nominally in the system combine to create a secure system state. Such methods also comprise determining whether the combined signal about equals the secure system state (for the number of sensors in the system) and outputting a corresponding signal.

If desired, the sensing of the combined signal can be via a vehicle chassis ground and/or the sensors can be nominally wired in parallel. In some situations a resistor contributes to the combined signal. In addition, or in the alternative, such methods can further comprise noting the location of the vehicle when the signal fails to indicate that the combined signal is indicative of the secure system state for the number of sensors.

Various embodiments provide fuel anti-theft controllers including a circuit and/or sensors which define nominal (secure) and tampered-with states. The tampered-with states are indicative of the sensor(s) being absent. The controllers of the current embodiment, moreover, sense a combined state of (all of a pre-selected number of) the sensors and determine therefrom whether all of the pre-selected number of sensors are present and secure. In some embodiments, the controller senses the sensors (which can be wired in parallel) via a vehicle chassis ground. If desired, a resistor (which is about electrically equivalent to one or more of the sensors) and/or a geo-positioning unit can be connected to the controller. The sensors can include normally open switches and clamps which close the switches when installed properly. The sensors can be secured by other means such as fasteners, cable ties, zip ties, adhesives, etc. Some sensors include grounding straps while others include ground return leads. In some embodiments, sensors are positioned at the vehicle fuel cap and/or fuel filter.

To the accomplishment of the foregoing and related ends, certain illustrative aspects are described herein in connection with the annexed figures. These aspects are indicative of various non-limiting ways in which the disclosed subject matter may be practiced, all of which are intended to be within the scope of the disclosed subject matter. Other novel and/or nonobvious features will become apparent from the following detailed disclosure when considered in conjunction with the figures and are also within the scope of the disclosure.

BRIEF DESCRIPTION OF THE FIGURES

The detailed description is described with reference to the accompanying figures. In the figures, the left-most digit(s) of a reference number usually corresponds to the figure in which the reference number first appears. The use of the same reference numbers in different figures usually indicates similar or identical items.

DETAILED DESCRIPTION

This document discloses systems, apparatus, methods, etc. for detecting potential fuel theft and more particularly for detecting fuel theft related events associated with vehicles such as planes, boats, automobiles, and trucks among other vehicles.

Figure 1:
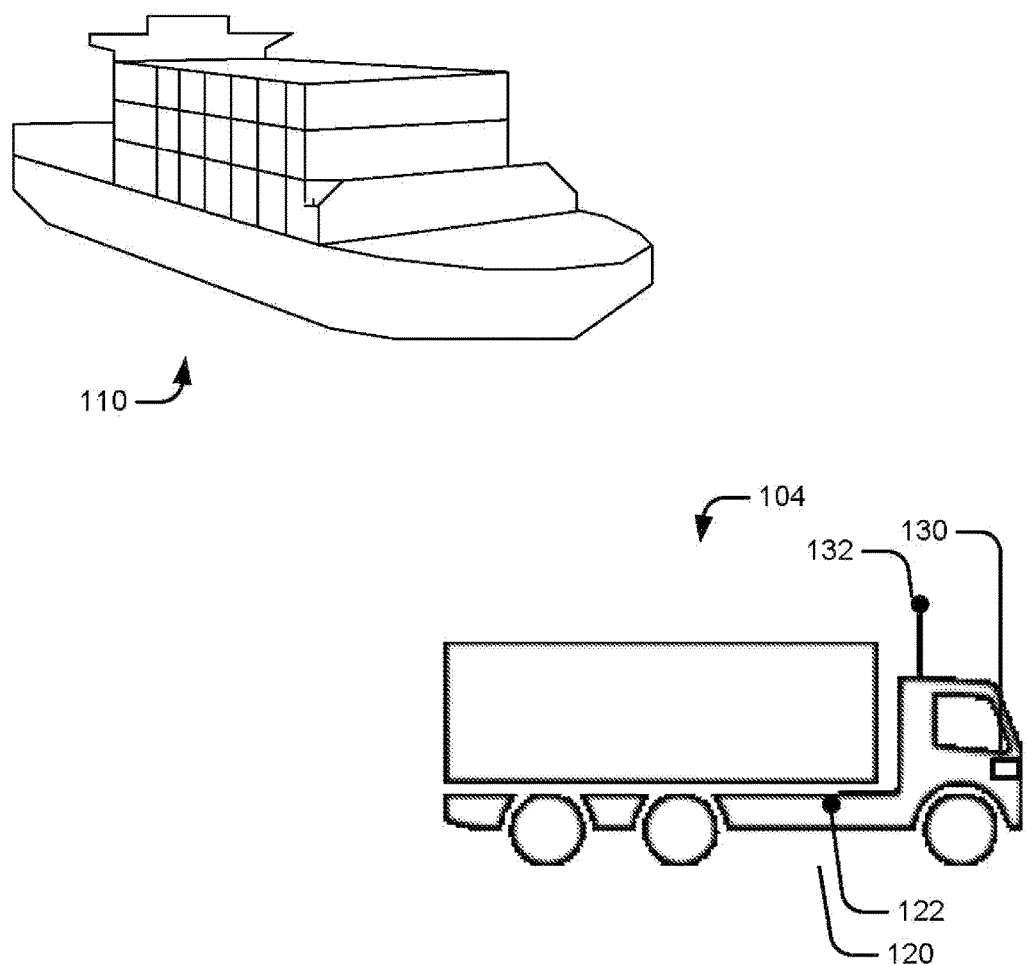
FIG. 1 illustrates vehicles subject to fuel theft.
Figure 1:
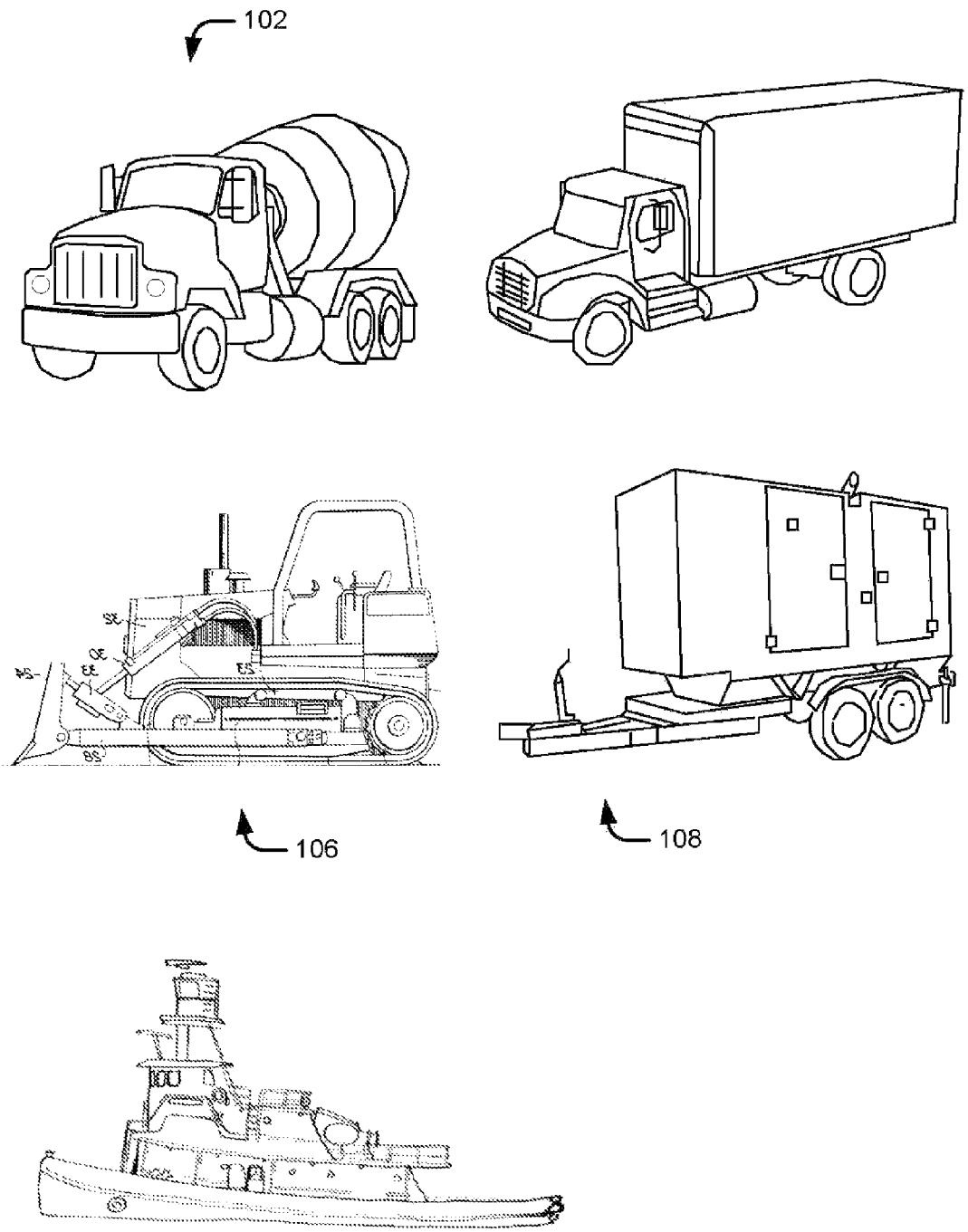

FIG. 1 illustrates vehicles subject to fuel theft. More particularly, FIG. 1 illustrates a concrete truck 102, a delivery truck 104, a bulldozer 106, a generator trailer 108, a ship 110, a fuel tank 120, an entry point 122, an anti-theft controller 130, and an antenna 132. These vehicles 102, 104, 106, 108, and 110 (among others) have a number of common traits. For one thing, they all contain fuels of various types which are all at least somewhat valuable. Moreover, the owners, operators, and other users associated with them take and/or leave them at locations which are often remote from other users and at which witnesses of a potential fuel theft might be far and few between. In the alternative, or in addition, many potential witnesses might not care enough to report suspicious activities or might even be sympathetic to those who would undertake such actions. Thus, these vehicles and/or the fuel in them are susceptible to fuel-theft from time to time.

For instance, consider the delivery truck 104. A driver often takes the delivery truck 104 on routes delivering and/or picking up various goods and/or delivering various services. Those routes might take the driver into areas far from a depot, station, or other location at which the truck is normally garaged, parked, etc. Those garages are typically staffed by the owner of the delivery truck 104 and/or employees or other agents of the owner. Thus, if a driver desires to take fuel from the delivery truck 104 in a manner not authorized by the owner, it is likely that the driver will wait to do so until they are on a route or supposedly on a route.

When they feel ready to take the fuel, the driver will typically stop the truck in a spot "suitable" for doing so and exit its cab. They will then often find an entry point 122 in the fuel system of the delivery truck 104 through which to access the fuel. For instance, they will take the fuel cap off of the fuel tank 120, insert a hose into the fuel tank 120, and siphon fuel from the fuel tank 120. Subsequently, such drivers will either put the fuel to their personal use, sell it, or make some other unauthorized use of the fuel. Such fuel thefts (alone and/or cumulatively) can represent a significant loss for the owner of the delivery truck 104. Of course, any vehicle which contains fuel stands at risk of such thefts. Indeed, it was estimated in 2013 that fuel thefts cost the economy of Mexico alone 2-4 Billion $US annually. See The Aftermath Of Mexico's Fuel Theft Epidemic: Examining The Texas Black Market And The Conspiracy To Trade In Stolen Condensate by Luke B. Reinhart, May 9, 2014.

Some embodiments provide systems for detecting potential fuel thefts and for alerting owner and/or other users of such activities. As FIG. 1 further shows the fuel anti-theft controller 130 can be mounted in, or on, the delivery truck 104 to detect activity which might indicate that someone might have stolen fuel, is stealing fuel, and/or is about to steal fuel. The fuel anti-theft controller 130 is typically connected to a plurality of sensors located at entry points to the vehicle's fuel system and monitors the same for potential tampering.

The sensors cause the fuel anti-theft controller 130 to generate a signal should some activity, condition, etc. cause one or more of the sensors to change state from a secure state to a tampered-with state or should a sensor appear to be missing from the system (whether suddenly or not). Moreover, the fuel anti-theft controller 130 of embodiments communicates and/or cooperates with an onboard geo-positioning unit, computer, etc. to time stamp and/or location stamp such occurrences. Further still, the fuel anti-theft controller 130, the geo-positioning system 132, and/or some other device on the delivery truck 104 can transmit information regarding such occurrences to remote owner/operators, central alarm consoles, etc.

Figure 2:
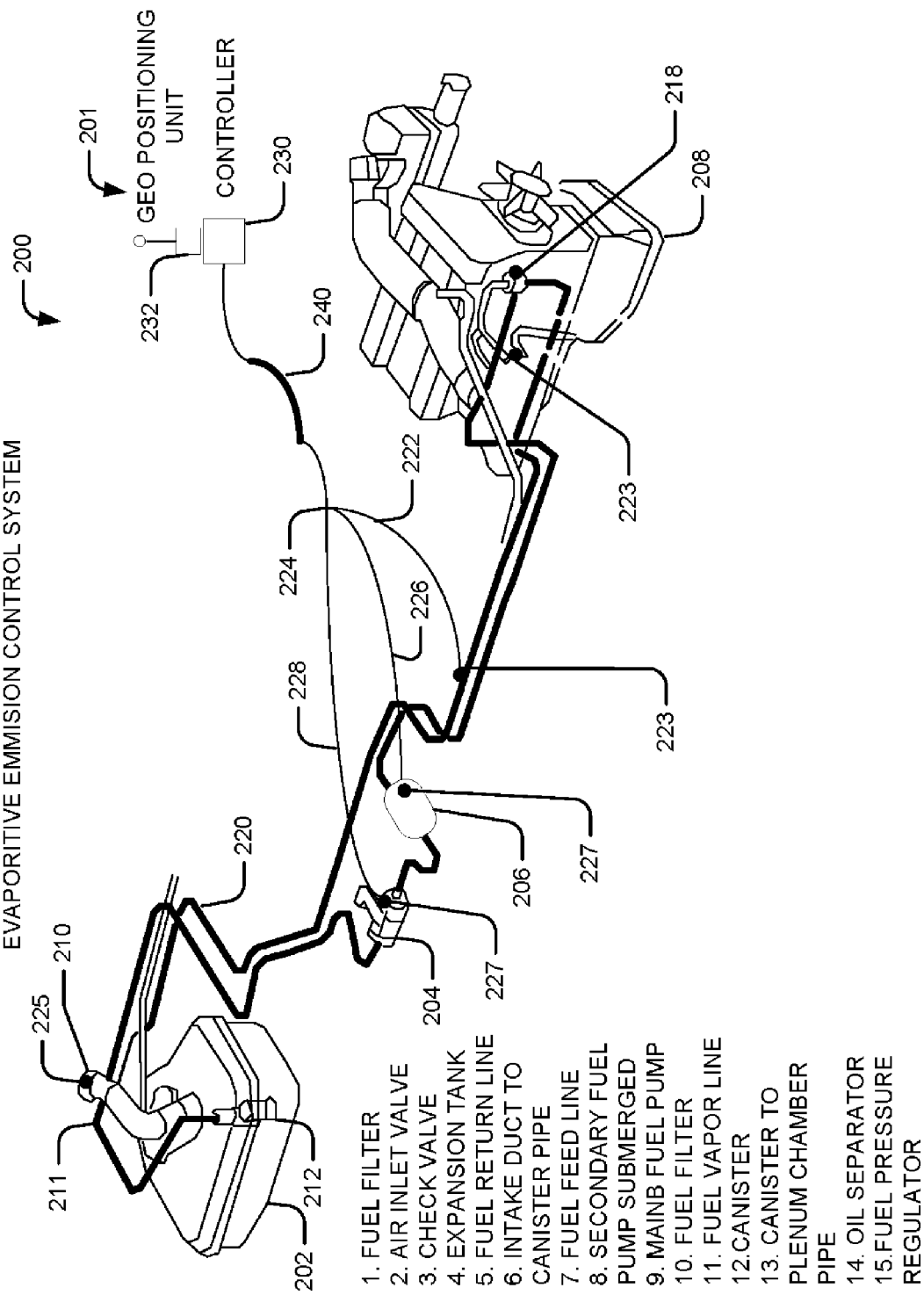
FIG. 2 illustrates a fuel anti-theft system installed on a vehicle.

FIG. 2 illustrates a fuel anti-theft system installed on a vehicle. More particularly, FIG. 2 illustrates a fuel system 200, the anti-theft system 201, a fuel tank 202, a fuel pump 204, a fuel filter 206, an engine 208, a fuel cap 210, a fuel inlet (tube, pipe, etc.) 211, a secondary fuel pump 212, a fuel pressure regulator 218, a fuel return line 220, a coupling 222, sensors 223, 225, and 227, cables 224, 226, and 228, a controller 230, a geo-positioning unit 232, and a conduit 240. At this juncture, a brief discussion of the fuel system 200 of a typical vehicle might be beneficial.

As those skilled in the art will appreciate, most vehicles include a fuel system 200 to deliver fuel stored in a fuel tank 202 to the engine 208. Those fuel systems 200 are replete with entry points making the fuel therein susceptible to theft. More particularly, in commercial vehicles in particular, the fuel tank 202 can contain hundreds of gallons of fuel, each gallon of which being valued at several US dollars as of this writing.

The fuel cap 210 presents one of the many entry points associated with a typical vehicular fuel system. Moreover, the fuel cap 210 is usually located in an easily accessible location making it particularly attractive to thieves as an entry point. Moreover, often the fuel inlet 211 and fuel tank 202 are formed integrally with one another (or are welded together or otherwise permanently coupled). Yet, in vehicles in which they are separate components, the coupling between these two components represents another entry point in that the coupling can be disconnected allowing fuel to drain out of (or be pumped out of) the fuel system 200. Many fuel tanks 202, furthermore, contain a secondary fuel pump 212 or have it mounted in close proximity thereto. Thus, the secondary fuel pump 212 of some vehicles presents another system coupling (or even a pair thereof), and therefore, an entry point.

From the fuel tank 202, a fuel line runs to another fuel system component (as illustrated by FIG. 2) such as the primary fuel pump 204. Again, this component presents another pair of entry points rendering the fuel vulnerable to theft. The fuel filter 206, fuel pressure regulator 218, engine 208, and fuel return line 220, all include couplings that also render the fuel vulnerable. Moreover, vehicle manufacturers sometimes find it desirable to use two or more pieces of tubing, piping, hose, etc. to route fuel from one component to another. As a result, a coupling 222 can appear in many places apart from the discrete components illustrated by FIG. 2. As noted, therefore, typical fuel systems 200 are replete with entry points which render the fuel contained in the systems vulnerable to theft.

With continuing reference to FIG. 2, embodiments provide anti-theft systems 201 on vehicles such as delivery truck 104. The anti-theft system 201 of the current embodiment includes the controller 230, the geo-positioning unit 232, the sensors 223, 225, and 227, and the cables 224, 226, and 228 among other things. The controller 230 of the current embodiment resides in the crew cabin of the vehicle and, more particularly, can be mounted in the dashboard or at some location relatively inaccessible to users of the vehicle. The geo-positioning unit 232 can also reside in the cabin although, if desired, it can be located in an accessible area of the cabin. In the alternative, or in addition, the geo-positioning unit 232 can be a component of the controller 230. The sensors 223, 225, and 227 are clamped to the couplings 222 and/or other components of the fuel system 200 which represent entry points. The cables 224, 226 and 228 run from the sensors 223, 225, and 227 to the controller 230 and also (in the current embodiment) run through conduits 240.

The cables 224, 226, and 228 provide electrical conductivity between the sensors 223, 225, and 227 and the controller 230 and, therefore, allow the controller 230 to sense the state of the sensors (as a group in the current embodiment). Furthermore, the conduits 240 provide protection to the cables 224, 226, and 228 from mechanical damage arising from abuse, neglect, outright tampering, etc. The conduits 240 (and, for that matter, the cables 224, 226, and 228) can be disguised to appear to be OEM (original equipment manufacturer), after-market, etc. equipment that has been on the vehicle for some time. The conduits 240 can be (among other things) a piece of cable sheathing, braided hose, corrugated conduit (of type SM-1216-BK and available from Sealcon LLC located on 7374 S. Eagle St, Centennial Colo. 80112 etc. and/or can be smeared with dirt, grease, grime, etc. normally available on the vehicle or created for such purposes.

As is further disclosed with reference to FIGS. 3 and 5-10, the sensors 223, 225, and 227 include normally open switches and clamps. The clamps are configured to hold the sensors against the various couplings/components and (by doing so) to urge the switches toward their closed positions. It is these closed positions (collectively, in the current embodiment) which indicate that the fuel system 200 is secure and/or un-tampered-with. Indeed, should even one of the switches open (or a sensor disappear from the anti-theft system 201), the controller 230 of the current embodiment will interpret that event as an indication that some user might be tampering with the fuel system 200 and/or attempting to gain access to the fuel via a monitored entry point/coupling/component.

Figure 3:
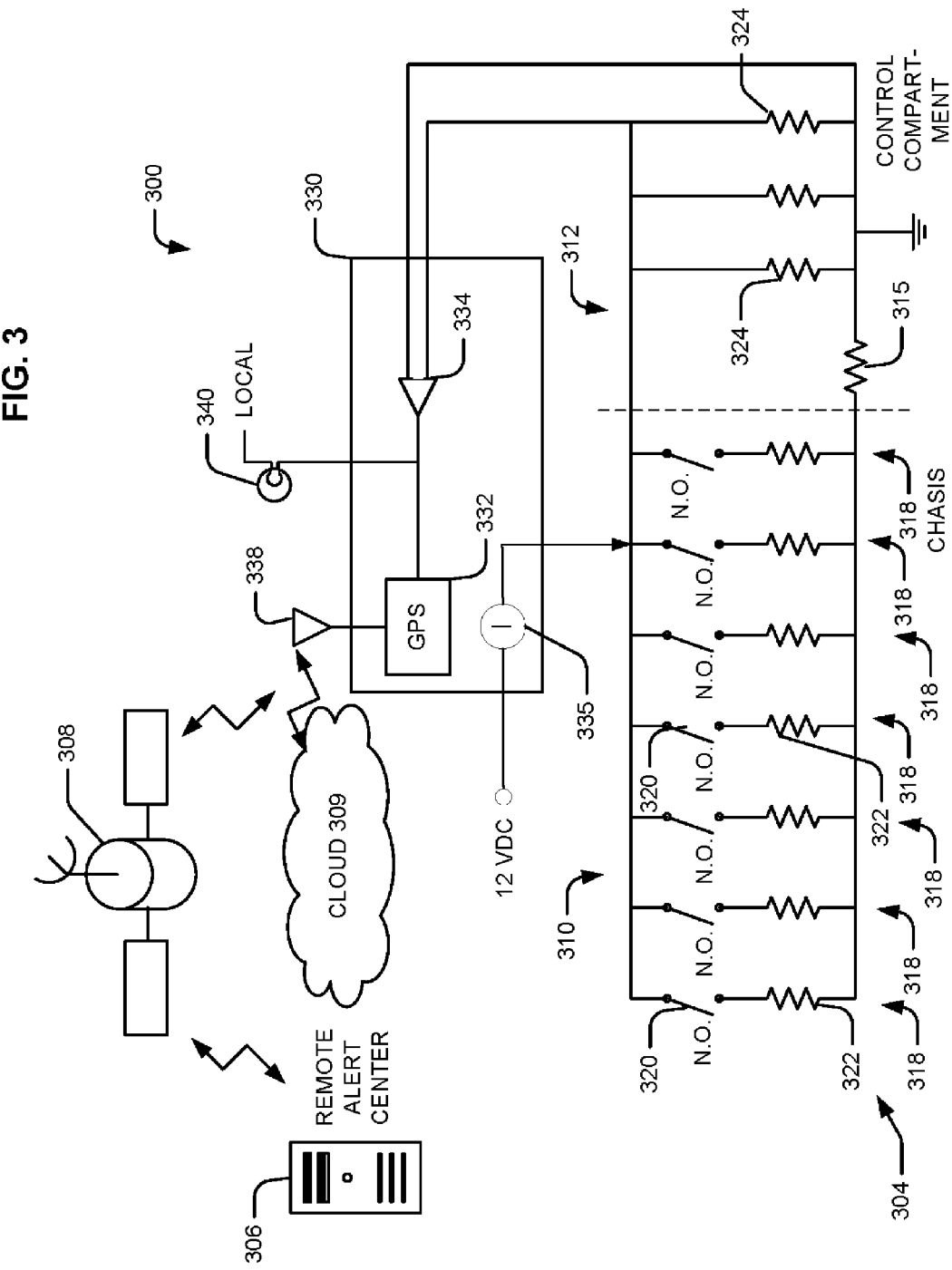
FIG. 3 schematically illustrates a fuel anti-theft system.

FIG. 3 schematically illustrates a fuel anti-theft system. More particularly, FIG. 3 illustrates an anti-theft system 300, an exterior subsystem 304, a remote alert center 306, the Internet "Cloud," a satellite 308, a sensor network 310, a set of resistors 312, sensors 318, sensor switches 320, sensor resistances 322, resistors 324, a controller 330, geo-positioning unit 332, a comparator 334, an antenna 338, and a local indicator 340. If desired a processor could be used instead of, or in addition to the comparator 334. In such cases, the processor could be configured with an analog input to sense the resistors and/or to determine whether the system is secure or has potentially been tampered with.

Thus, the anti-theft system 300 allows the controller 330 to communicate with the remote alert center 306 via the cloud 309 and/or via a geo-positioning system including its satellites 308 and/or other infrastructure). If the controller 330 should issue an alert, therefore, the remote alert center 306 can receive the alert via either the cloud, the geo-positioning system, and/or some other telecommunications system (such as a cellular telephone system). Users and/or servers, computers, etc. in communication with the remote alert center 306 can monitor, react to, data mine, etc. these alerts and/or take corrective action. For instance, a vehicle owner could investigate the alerts, place the vehicle/driver under surveillance, etc.

With continuing reference to FIG. 3, the controller 330 resides on a vehicle as does much of the rest of the anti-theft system 300 of the current embodiment. For instance, each of the sensors 318 resides on the vehicle and comprises a normally open switch 320 and often some (inherent) internal resistance 322. Of course, that internal resistances 322 might be associated with internal interconnects of the sensors 318, its external wiring, connections there between, etc. However, in some embodiments, various sensors 318 comprise resistors of about 10 k-ohm, 5.1 k-ohm or 3.3 k-ohm with a 1% tolerance. As a result, each sensor 318 of the current embodiment will nominally have two states: a secure state and a potentially tampered-with state. In the secure state, the sensors 318 have their normally open switches 320 clamped closed by a clamp which secures the sensors on their respective components. Thus, the sensor 318 (wired in parallel with the other sensors 318) contributes its conductance/resistance 322 to the overall sensor network 310. But, in the potentially tampered-with state, the normally open switches 320 are open so that the sensors 318 appear to be electrical "open" paths thereby contributing no conductance and/or an infinite resistance to the sensor network 310.

Thus, when an anti-theft system 300 is installed and operating nominally on a vehicle, all of the switches 320 of the sensors 318 are held closed by the clamps and are sensed accordingly by the controller 330. But, if one or more sensors 318 are tampered-with, a corresponding number of switches 320 are likely to open thereby changing the overall resistance/conductance of the sensor network 310. Furthermore, the controller 330 (and/or its comparator 334) can be configured to sense whether the nominal conductance/resistance of the sensor network 310 is present or whether it has been altered. More specifically, the comparator 334 can be configured to produce a signal based on whether or not a known/pre-selected number of sensors 318 are present with their normally open switches 320 in the closed position.

Thus, the expected, overall, combined resistance/conductance of the sensor network would be:

$$R_{secure} = 1/n * R_{sensor}$$

Where:
$R_{secure}$ is the expected, overall resistance of the sensor network,
n is the pre-selected number of sensors 318 (resistances 322), and
$R_{sensor}$ is the resistance 322 of one sensor 318.

A power supply 335 (internal to the controller 330 of the current embodiment) can supply a trickle current to the sensor network 310. Furthermore, the comparator 334 can be configured to monitor the sensor network 310 for changes in the voltage across the sensor network 310 that correspond to the pre-selected number of sensors 318 being in their secure state and present in the sensor network 310. Of course, any resistance 315 associated with the chassis ground path can be accounted for in this determination by reference to the following equations:

$$R_{expected} = R_{secure} + R_{chassis}$$

Where:
$R_{expected}$ is the expected resistance and
$R_{chassis}$ is the resistance 315 of the chassis ground path.
And $$V_{expected} = I_{controller} * R_{expected}$$

Where:
$V_{expected}$ is the expected voltage and
$I_{controller}$ is the current supplied by the controller.

Thus, should the voltage sensed by the comparator 334 increase by about the amount associated with one of the switches 320 opening (or a sensor 318 being removed from the sensor network 310), the controller 330 can generate a signal indicative of potential tampering with the fuel system 200. Of course, the set point of the comparator 334 can be adjusted to account for tolerances associated with the foregoing parameters. Note that if the chassis resistance 315 is low, that voltage change would correspond to an increase of the resistance of the sensor network of:

$$\Delta R_{tamper} = R_{expected} - t/R_{secure};$$

$$\Delta V_{tamper} \geq I_{controller} * \Delta R_{tamper}; \text{ or}$$

$$V_{tamper} = V_{expected} + \Delta V_{tamper}$$

Where t is the number of open/missing sensors

Since there might be scenarios in which users might want to install more sensors 318 than the number that a particular controller 330 is configured for, the set point of the comparator 334 can be adjusted downward by an amount corresponding to the addition of additional sensors 318 (and their additional conductances across the parallel sensor network 310). Of course, an additional controller 330 could be added to the anti-theft system 300 to provide capacity for additional sensors 318. Should users wish to use fewer than the pre-selected number of sensors 318, then users can place a corresponding number (and value) of resistors 324 across the inputs to the controller 330 to emulate the un-installed sensors 318. Those resistors 324, moreover, could be in the same (or another) secure location as the controller 330 itself. In other embodiments, the resistors 324 could be supplied via DIP (dual in-line) switches or similar devices in or associated with the controller 330. In the alternative, or in addition, the unused sensors 318 could be connected to the controller 330 and clamped such that the normally open switches 320 remain closed.

In some embodiments, the controller 330 is configured to work in conjunction with 10 (ten) sensors 318. Moreover, in the current embodiment, each sensor 318 has a resistance of approximately 10 k-ohm. Thus, the sensor network 310 has an electrically equivalent resistance of 1 k-ohm. Table 1, below, lists electrically equivalent resistances for sensor networks 310 having various pre-selected numbers of sensors 318 and lists electrically equivalent resistances for sensor networks 310 (of the current embodiment) with various numbers of open switches 320.

TABLE 1

| No. of Sensors | No. of Open Sensors | Resistance (k-ohm) |
| --- | --- | --- |
| 1 | 9 | 10 |
| 2 | 8 | 5 |
| 3 | 7 | 3.33 |
| 4 | 6 | 2.5 |
| 5 | 5 | 2 |
| 6 | 4 | 1.67 |
| 7 | 3 | 1.43 |
| 8 | 2 | 1.25 |
| 9 | 1 | 1.11 |
| 10 | 0 | 1 |

Thus, should a user attempt to tamper with the fuel system 200, the controller 330 would sense it. For instance, removing one of the sensors 318 (either physically or electronically) from the sensor network/anti-theft system 201 would cause the corresponding electrical path to open thereby increasing the voltage to beyond the comparator 334 set point. Unclamping a sensor 318 would open the switch 320 leading to the same result. Attempting to first (before otherwise tampering with a fuel system) place a resistor of the same resistance as the sensor resistance 322 would result in a decrease in voltage which could cause the comparator 334 (if configured to sense voltages outside of a band) to sense an attempt to tamper with the fuel system 200 also (even if temporarily). And comparators 334 of some embodiments could be configured to latch the output signal in such situations.

With ongoing reference to FIG. 3, the signal output by the comparator 334 could serve several purposes. For one such purpose, it could cause a local indicator 340 to signal potential tampering. Of course, some embodiments either do not provide a local indicator 340 or provide it at a location not accessible to the normal users of the vehicle (for instance, the driver). The local indicator 340 could be hidden in a locked compartment or it could be provided within the housing of the controller 330 and, thus, available only to service technicians and/or others with the proper authority/ tools to open the controller 330. The comparator signal could also be communicated to the geo-positioning unit 332.

The geo-positioning unit 332 could be configured to perform a variety of activities. For instance, it could (responsive to the comparator 334 signal) time and/or location stamp the occurrence(s) of the signal. Furthermore, the geo-positioning unit 332 could transmit such information to the remote alert center 306 via some telecommunications system. Additionally, or in the alternative, the geo-positioning unit 332 could track the location, speed, movement, lack of movement, etc. of the vehicle and transmit such information to the remote alert center 306. Thus, the anti-theft system 300 of embodiments can alert users (such as owners) to potential tampering with the fuel systems 200 of various vehicles.

Figure 4:
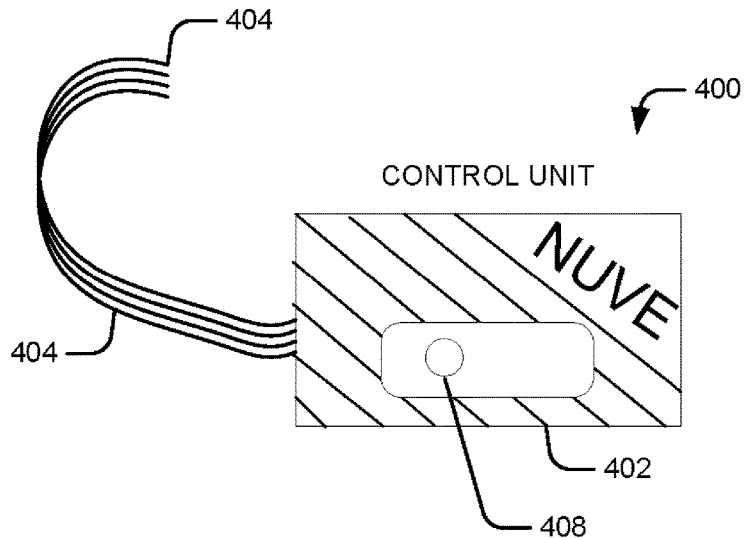
FIG. 4 illustrates a fuel anti-theft controller.

FIG. 4 illustrates a fuel anti-theft controller. The controller 400 of the current embodiment includes a tamper-resistant housing 402 and a number of leads 404 hardwired to the controller 400. The tamper-resistant housing 402 can be any sort of housing sufficient to either prevent users from physically entering the housing or at least sufficiently strong that most significant attempts to do so would leave pry marks, dents, scrapes, etc. on the housing. Thus, attempts to enter the controller 400 (and/or alter its internal components such as the comparator 334) could be readily evident upon inspection of the housing. The leads 404 can also contribute to the security of the anti-theft system 300. For instance, internal to the tamper-resistant housing 402, they can terminate in soldered, brazed, etc. connections to a PCB (printed circuit board) or otherwise be secured against un-detectable removal from the controller 400.

Moreover, in some embodiments, the leads 404 correspond in number to the pre-selected number of sensors 318. For instance, in embodiments in which every sensor 318 communicates with the controller 400 via a positive and a (ground) return lead, the controller 400 will have 2n leads (where "n" is the pre-selected number of sensors 318). However, it might be the case that one or more sensors 318 will use the chassis ground as a return path. In such situations, the number of leads 404 will be reduced accordingly and the associated set of sensors 318 will be selected with a number of return leads appropriate for controllers configured in that manner.

Additionally, or in the alternative, the controller 400 includes the local indicator 408. That local indicator 408 could be any indicator which can indicate that a tampering event has been detected (and/or is ongoing whether latched or not). For instance, the local indicator 408 could be a light, LED (light emitting diode), counter, blowable fuse/link, etc. If the controller 400 is in a secure location (for instance, "buried" in a dashboard) then the local indicator 408 will be correspondingly inaccessible to most users such as the vehicle driver. Of course, the local indicator 408 could be replaced/augmented with a jack, connector, etc. allowing for a connection of the controller 400 to an external event indicator.

Figure 5:
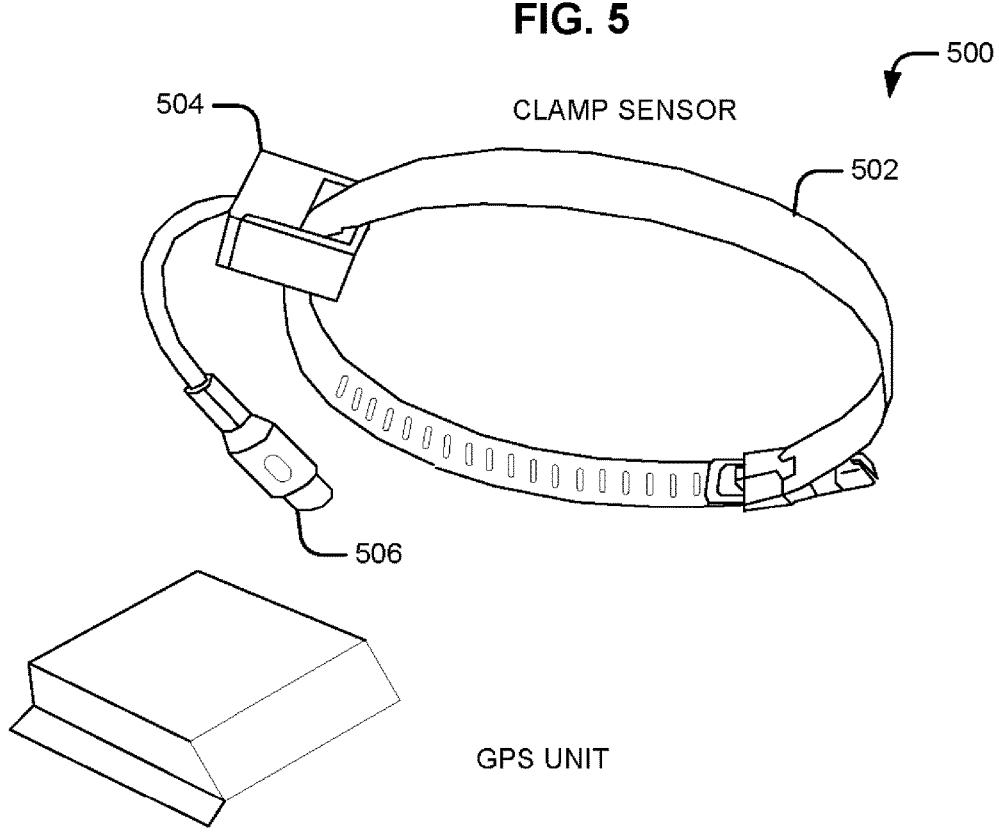
FIG. 5 illustrates a fuel anti-theft clamp sensor.

FIG. 5 illustrates a fuel anti-theft clamp sensor. The clamp sensor 500 of the current embodiment comprises a pipe clamp 332, a band clamp 502, zip lock tie, etc. capable of securing the sensor 500 to a fuel system component such as those illustrated by FIG. 2. The clamp 502 can also, when clamped, exert sufficient force on the switch 504 so as to close it (particularly if the switch 504 is a normally open switch). The switch 504 can be a normally open switch and can be positioned relative to the clamp 502 such that the clamp 502 can clamp it between the clamp and the component to which the sensor 500 is clamped. In the alternative, or in addition, the bulk of the switch 504 can be located on the outside of the clamp 502 with the actual electrical/mechanical switch and/or an actuator operatively coupled thereto positioned within the clamp (and subject to being clamped in the electrically "closed" position). Note, also that the sensor could also house a resistor to set the resistance 322 of the sensor 500 to a desired value if desired. Of course, the switch 504 (and resistor therein) could be wired to the connector 506 which can include conductors for both the positive and ground return paths associated with the sensor 500. For instance, the connector 506 of embodiments can be a model no. 45-4610 type connector available from LKG industries, Inc located on 3660 Publishers Dr, Rockford, Ill. 61109. Since the sensor 500 of the current embodiment has a connector 506, it can be used to monitor entry points which are subject to relatively frequent and legitimate openings. For instance, sensors 500 with connectors could be used on fuel caps 210. Note that in scenarios involving such entry points, the anti-theft system 300 could still be configured to raise an alarm when the connector 506 is disconnected (and the corresponding conductive path opens). But, the remote alert center 306 could be configured to, upon an alert, query the geo-positioning unit 332 for the location of the vehicle. If the vehicle happens to be located at a fueling depot, gas, station, etc. that location can be noted and considered in how the alert is handled.

Figure 6:
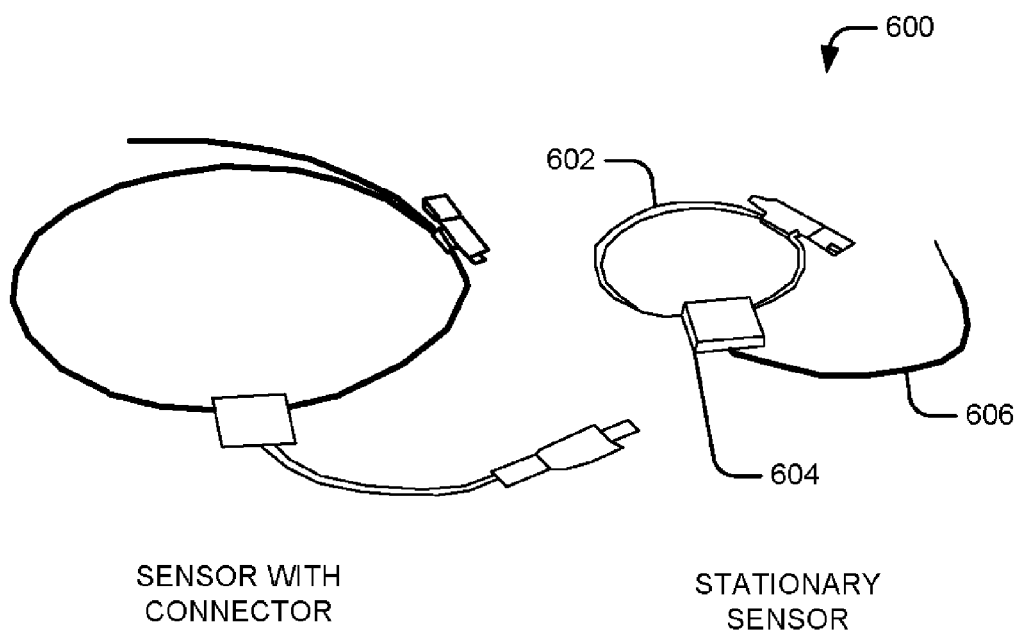
FIG. 6 illustrates a stationary fuel anti-theft sensor.

FIG. 6 illustrates a stationary fuel anti-theft sensor. The sensor 600 of the current embodiment includes a clamp 602, a sensor package 604, and a lead 606 (or leads). The leads 606 are configured to be permanently, mechanically coupled (and in permanent electrical communication) with a sensor network 310. In some cases, that coupling can be via soldering, brazing, etc. Thus, the sensor 600 of the current embodiment can be used to monitor entry points which, ordinarily, would experience only occasional openings. In other words, they are stationary. For instance, most couplings 222 and/or other components (exempting the fuel cap 210 for most vehicles) would be opened only if the vehicle is undergoing maintenance. Again, by querying the geo-positioning unit 334, checking maintenance orders/records, etc. the remote alert center 306 can determined whether the vehicle is located at an appropriate maintenance depot. The information so gained can be used in evaluating alerts arising from the sensor 600 of the current embodiment.

Figure 7:
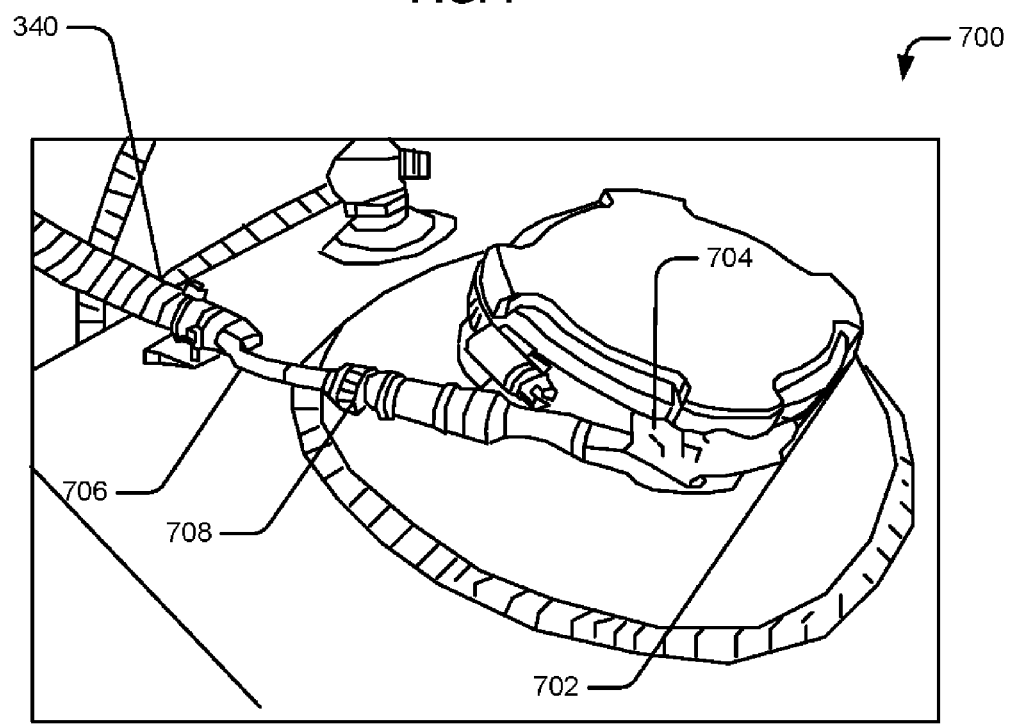
FIG. 7 illustrates a fuel anti-theft sensor installed on a fuel cap.

FIG. 7 illustrates a fuel anti-theft sensor installed on a fuel cap. The sensor 700 of the current embodiment comprises a clamp 702, a sensor package 704, a lead 706, and a grounding strap 708. The grounding strap 708 can be used to ground the sensor 700 to the vehicle chassis. Doing so ensures that the sensor 700 has a ground return path to the sensor network 310 despite the possibility that non-conductive material might interpose themselves between the sensor 700 and the chassis ground. For instance, OEMs (and after market manufacturers) often make fuel caps 210 from plastic and/or other non-conductive materials. Moreover, even should such fuel system 200 components be made of conductive materials, grease, dirt, grime, etc. might exist on one or more components rendering them non conductive. Moreover, some components might be coated in paint, wax, primer, etc. rendering such components non conductive. Of course, the underlying components could be clamped, stripped, etc. to increase their conductance in appropriate circumstances. Note that the grounding strap 708 could comprise a copper wire, piece of aluminum foil, etc. without departing from the current disclosure.

Figure 8:
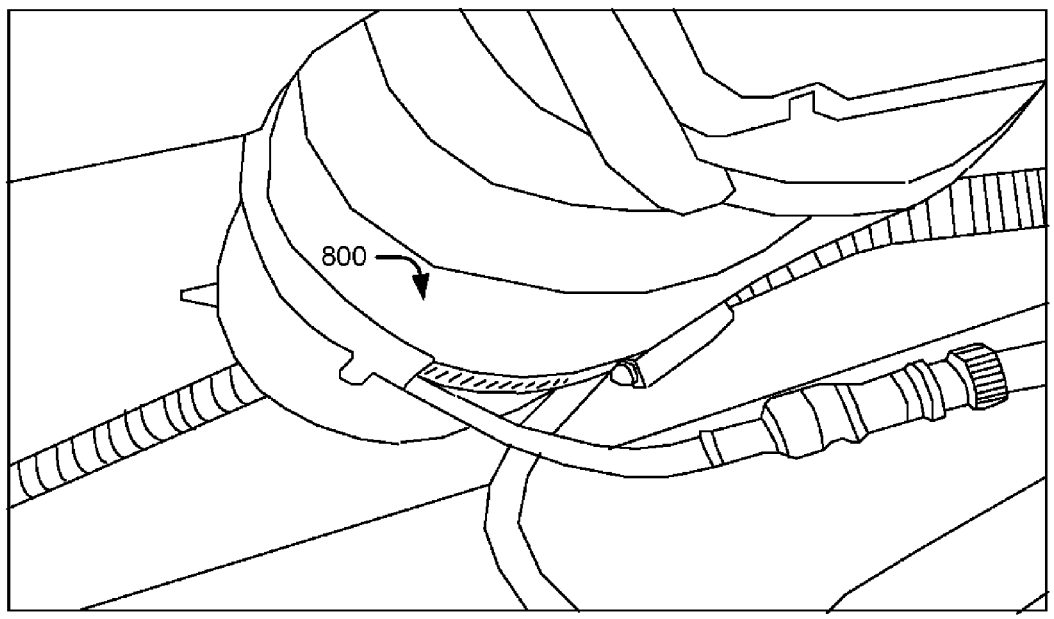
FIG. 8 illustrates a fuel anti-theft sensor installed on a fuel filter.
Figure 9:
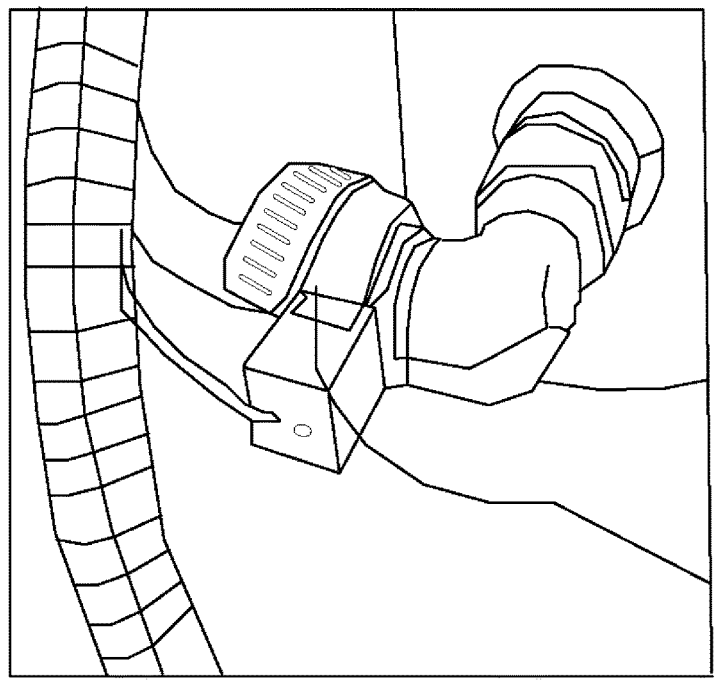
FIG. 9 illustrates a fuel anti-theft sensor installed on a fuel suction line.
Figure 10:
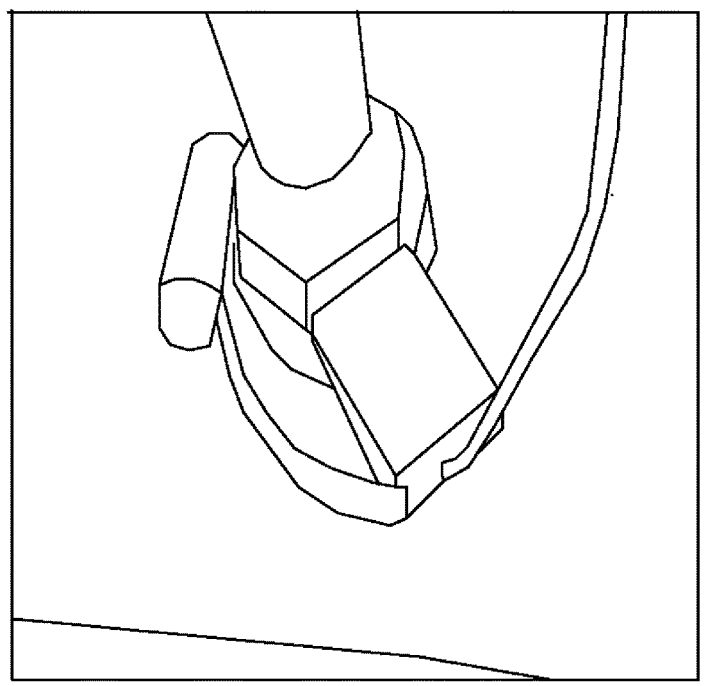
FIG. 10 illustrates a fuel anti-theft sensor installed on a fuel return line.

FIG. 8 illustrates a fuel anti-theft sensor installed on a fuel filter. Meanwhile, FIG. 9 illustrates a fuel anti-theft sensor installed on a fuel suction line and FIG. 10 illustrates a fuel anti-theft sensor installed on a fuel return line. Thus. FIGS. 8-10 illustrate that sensors 800, 900, and 1000 of embodiments can be installed at many locations throughout fuel systems 200 for many different types of vehicles.

Figure 11:
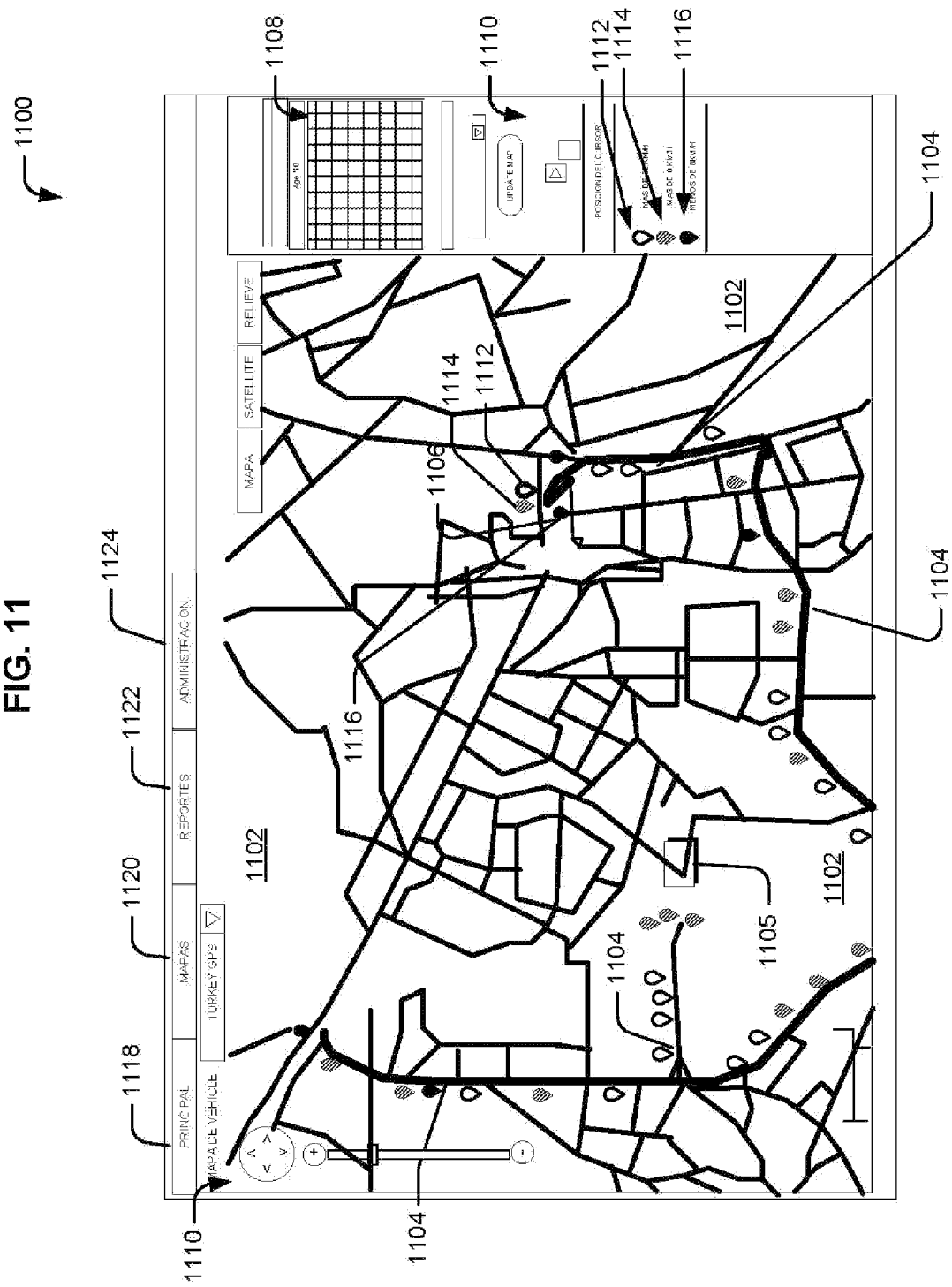
FIG. 11 illustrates a graphical user interface (GUI) of a fuel anti-theft system.

FIG. 11 illustrates a graphical user interface (GUI) of a fuel anti-theft system. More particularly, FIG. 11 shows the GUI 1100, and a map 1102, a route 1104, a destination 1105, a detour 1106, calendaring controls 1108, map controls 1110, route markers 1112, route cautions 1114, route warnings 1116, a home tab 1118, a maps tab 1120, reports tab 1122, and an administrative tab 1124. The GUI 1100 and underlying software application, program, etc. can be hosted by remote alert centers 306, servers, computers, mobile devices (for instance, cellular telephones, laptops, tablets, notebooks, etc.) among others. The GUI 1100 of the current embodiment allows users to monitor, explore, investigate, etc. activities which might be related to vehicular fuel theft.

More specifically, the GUI 1100 illustrated in FIG. 11 displays a map 1102 on which the route 1104 of a user-selected vehicle is displayed. That route 1104 includes one or more intended destinations 1105 such as a local shop, business, factory, etc. and, as displayed, a detour 1106. Moreover, the actual route 1104 (including the detour 1106) can be rendered based on geo-positioning data provided by the geo-positioning circuit 334 and/or queried therefrom. Note also that scheduled delivery routes could be displayed on the GUI 1100. Of course, the detour 1106 might be legitimate such as where the driver acted to avoid congestion, construction, flooding, etc. On the other hand, that detour 1106 could indicate a location at which the driver has tampered-with, is tampering with, and/or is about to tamper with the fuel system 200.

FIG. 11 also shows that the GUI 11100 can display various route markers 1112, route cautions 1114, and/or route warnings 1116. The route markers 1112 can be displayed corresponding to the locations at which the vehicle is proceeding at (or above) a user selected speed such as the local speed limit. In contrast, the route cautions 1114 can be displayed for locations at which the vehicle has slowed to below a user selected speed. Such behavior might be indicative of traffic/road related difficulties and/or imminent fuel system tampering. The GUI 1100 also shows several route warnings 1116 which correspond to locations at which the vehicle has slowed below some user-selected speed and/or stopped. Such behavior could be indicative of imminent or ongoing fuel system tampering and/or fuel theft. Note that the vehicle speeds, location, etc. can be obtained remotely by querying the fuel anti-theft system 300 of embodiments and/or other onboard systems. Thus, users such as owners can examine the map 1102 to determine where/when fuel theft might be occurring and/or patterns related thereto.

Of course, the GUI 1100 has other features as well. For instance, the calendaring controls 1108 allow a user to see the current date/time. In some embodiments, the calendaring controls 1108 allow users to select dates/times for which the GUI 1100 can display corresponding maps 1102, routes 1104, route markers 1112, route cautions 114, route warnings 1116, etc. Moreover, the GUI 1100 can include map controls 1110 for zooming into/out of maps 1102, navigating on maps 1102, saving maps 1102, printing maps 1102, etc.

GUIs 1100 of embodiments also include controls such as the home tab 1118, the maps tab 1120, the reports tab 1122, the administrative tab 1124, etc. These tabs 1118, 1120, 1122, and/or 1124 allow users to navigate between various and corresponding portions of the GUI 1100. For instance, the maps tab 1120 can allow users to navigate between various maps 1102 whereas the reports tab 1122 can provide corresponding functionality for various reports. The administrative tab 1124 can allow users to handle certain administrative activities such as user profile maintenance, vehicle profile maintenance, driver profile maintenance, etc. The home tab 1118 can provide overall GUI navigation controls such as those related to logging in, logging in, logging out, switching users, etc.

Figure 12:
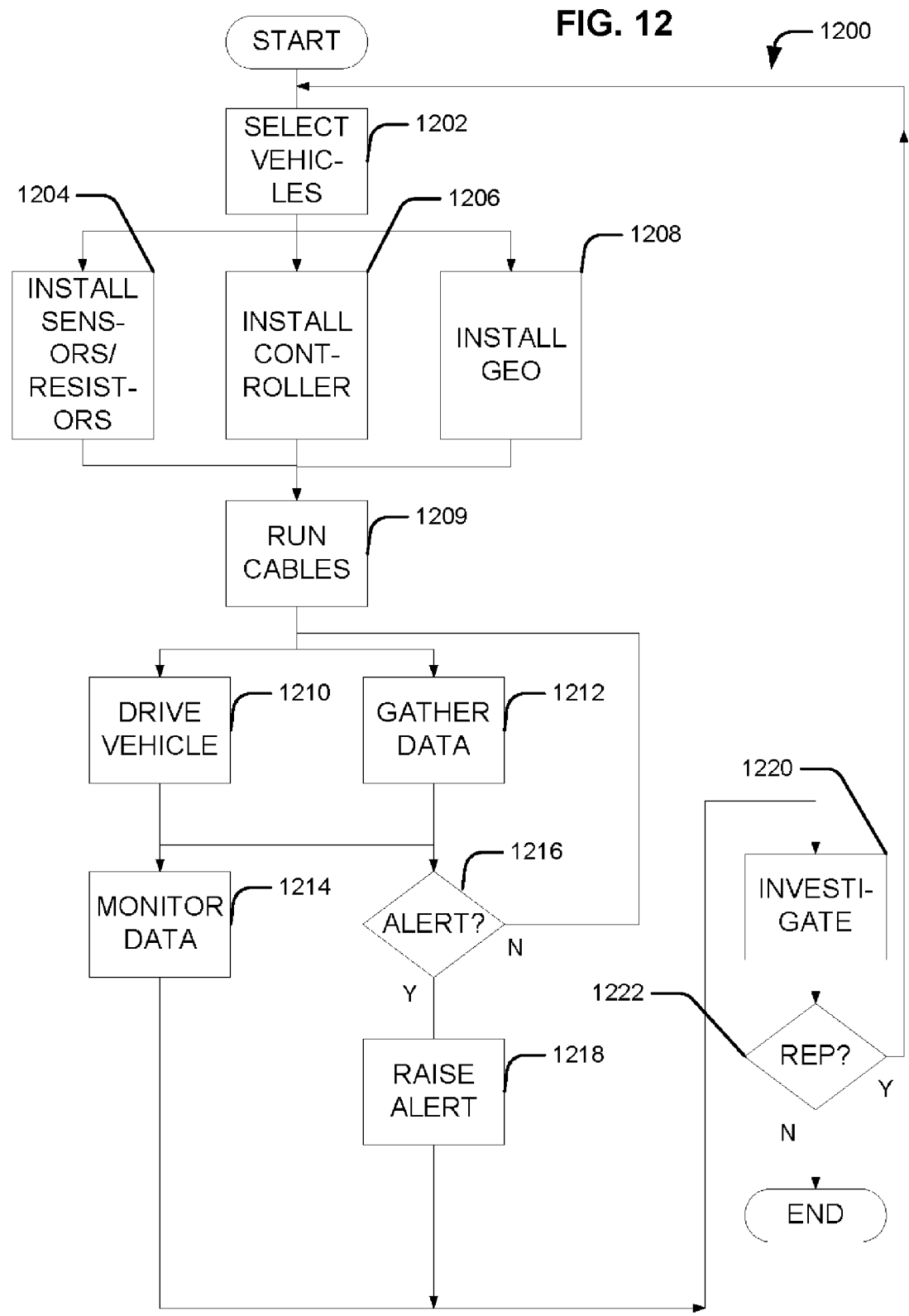
FIG. 12 illustrates a flowchart of a method of sensing fuel theft.

FIG. 12 illustrates a flowchart of a method of sensing fuel theft. The method 1200 comprises various activities such as selecting one or more vehicles on which to install anti-theft systems 300. These vehicles might be those involved in fuel theft and/or other suspicious activities, a group of vehicles which for some reason might be particularly susceptible to such activities, the vehicles driven by certain users, etc. See reference 1202.

Method 1200 can also comprise installing the various sensors on one or more of the selected vehicles. Thus, sensors can be clamped on to the fuel cap 210, the fuel intake 211, the fuel tank 202, the fuel pump(s) 204 and/or 212, the fuel filter 206, the fuel pressure regulator 218, various fuel lines such as the fuel return line 220, and/or various couplings 222 in the fuel systems 200 of those vehicles. If the number of installed sensors 318 does not equal the pre-selected number of sensors 318 for a given controller 330, then the anti-theft system 300 can be configured accordingly. For instance, if the anti-theft system 300 has too many sensors 318 for the selected controller 330, then an appropriate number of controllers 330 can be added to the anti-theft system 300. If, though or in addition, too few sensors 318 have been installed for the pre-selected number(s) of sensors associated with the number of controllers 330 in the anti-theft system 300, then various resistors 324 can be connected across one or more of the controller 330 inputs. Thus, the controllers 330 can be connected to sensor networks 310 having overall resistances/conductances corresponding to the pre-selected number(s) of sensors 318. See reference 1204.

Of course, if the controller(s) 330 have not already been installed, then they can be installed on the vehicle. For instance, the controller 330 can be mounted into the dashboard or otherwise installed at some relatively inaccessible location on the vehicle as indicated at reference 1206. If a separate geo-positioning unit is to be included in the anti-theft system 300, then it can be installed in/on the vehicle and/or connected to the controller. See reference 1208. Moreover, the various conduits 240 can be run through the vehicle from the location(s) of the sensor(s) 318 to the controller 330. The wires, cables 224, 226, and 228, grounding straps, etc. associated with the sensors can then be run through the conduits 240 and/or run separately therefrom. If desired, the conduits, cables, sensors, etc. can be disguised to appear as if they have been located on the vehicle for all or a portion of the life of the vehicle. For instance, dirt, grease, grime, etc. can be applied to them. See reference 1209.

Reference 1210 of FIG. 12 illustrates that the vehicle may be driven at some point. For instance, a particular driver(s) might be alerted to the presence of the anti-theft system 300 whereas some other drivers might be allowed to remain unaware of its presence. One way or another, as the vehicles are driven, the data generated by the anti-theft system 300 (and/or other onboard systems) can be gathered and/or monitored as indicated at references 1212 and 1214. If the data indicates that a tampering event might be underway then the appropriate route cautions/warnings can be raised/transmitted to the remote alert center. If the data suggests that tampering might not be occurring then the data monitoring can continue. See reference 1216 and 1218.

With continuing reference to FIG. 12, in scenarios involving potential tampering (and/or otherwise), users such as vehicle owners can investigate activities associated with the vehicle. See reference 1220. Of course, they can take appropriate actions such as placing various drivers, vehicles, etc. under surveillance. Method 1200 can repeat in whole or in part as indicated at reference 1222.

Figure 13:
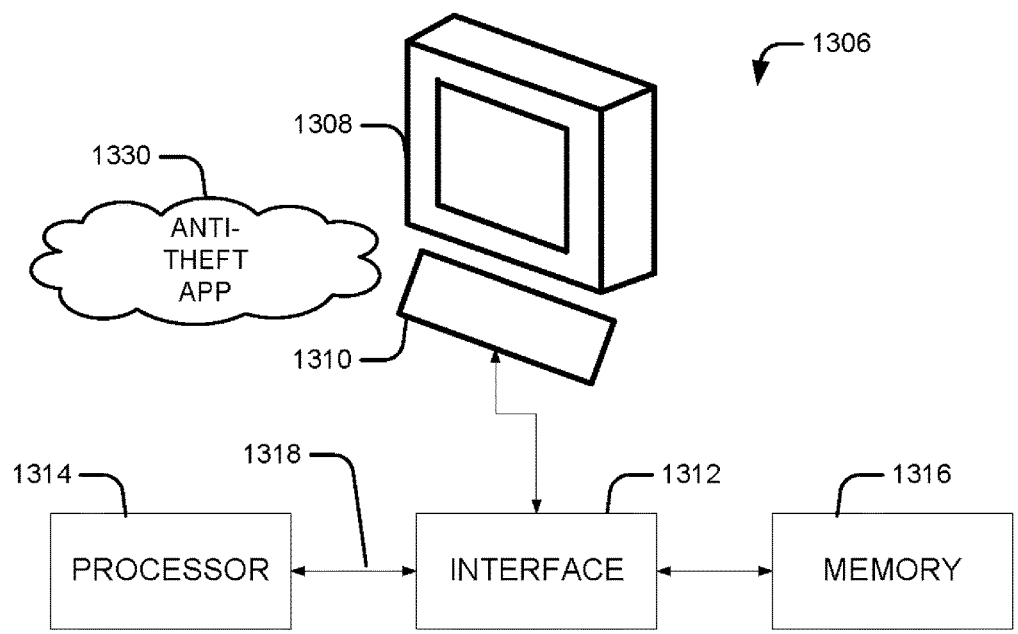
FIG. 13 illustrates a computer for use in fuel anti-theft systems.

FIG. 13 illustrates a computer for use in fuel anti-theft systems. Indeed, the computer 1306 could host an application 1330 for presenting the GUI 1100 (and processing the associated data) at the remote alert center. In some cases, the controller 330 could include some or all of the components of the computer 1306 although the controller 330 could be implemented in analog hardware, firmware, ASICs (application specific integrated circuits), RISC (reduced instruction set integrated circuits), etc.

At this juncture a few words might be in order about the computer(s) 1306 and/or other systems, apparatus, etc. used to design, store, host, recall, display, transmit, receive, etc. programs, applications, controllers, algorithms, routines, codes, GUIs, etc. of fuel anti-theft systems of embodiments. The type of computer 1306 used for such purposes does not limit the scope of the disclosure but certainly includes those now known as well as those which will arise in the future. But usually, these computers 1306 will include some type of display 1308, keyboard 1310, interface 1312, processor 1314, memory 1316, and bus 1318.

Indeed, any type of human-machine interface (as illustrated by display 1308 and keyboard 1310) will do so long as it allows some or all of the human interactions with the computer 1306 as disclosed elsewhere herein. Similarly, the interface 1312 can be a network interface card (NIC), a WiFi transceiver, an Ethernet interface, etc. allowing various components of computer 1306 to communicate with each other and/or other devices. The computer 1306, though, could be a stand-alone device without departing from the scope of the current disclosure.

Moreover, while FIG. 13 illustrates that the computer 1306 includes a processor 1314, the computer 1306 might include some other type of device for performing methods disclosed herein. For instance, the computer 1306 could include a microprocessor, an ASIC (Application Specific Integrated Circuit), a RISC (Reduced Instruction Set IC), a neural network, etc. instead of, or in addition, to the processor 1314. Thus, the device used to perform the methods disclosed herein is not limiting.

Again with reference to FIG. 13, the memory 1316 can be any type of memory currently available or that might arise in the future. For instance, the memory 1316 could be a hard drive, a ROM (Read Only Memory), a RAM (Random Access Memory), flash memory, a CD (Compact Disc), etc. or a combination thereof. No matter its form, in the current embodiment, the memory 1316 stores instructions which enable the processor 1314 (or other device) to perform at least some of the methods disclosed herein as well as (perhaps) others. The memory 1316 of the current embodiment also stores data pertaining to such methods, user inputs thereto, outputs thereof, etc. At least some of the various components of the computer 1306 can communicate over any type of bus 1318 enabling their operations in some or all of the methods disclosed herein. Such buses include, without limitation, SCSI (Small Computer System Interface), ISA (Industry Standard Architecture), EISA (Extended Industry Standard Architecture), etc., buses or a combination thereof.

With that having been said, it might be useful to now consider some aspects of the disclosed subject matter.

Figure 14:
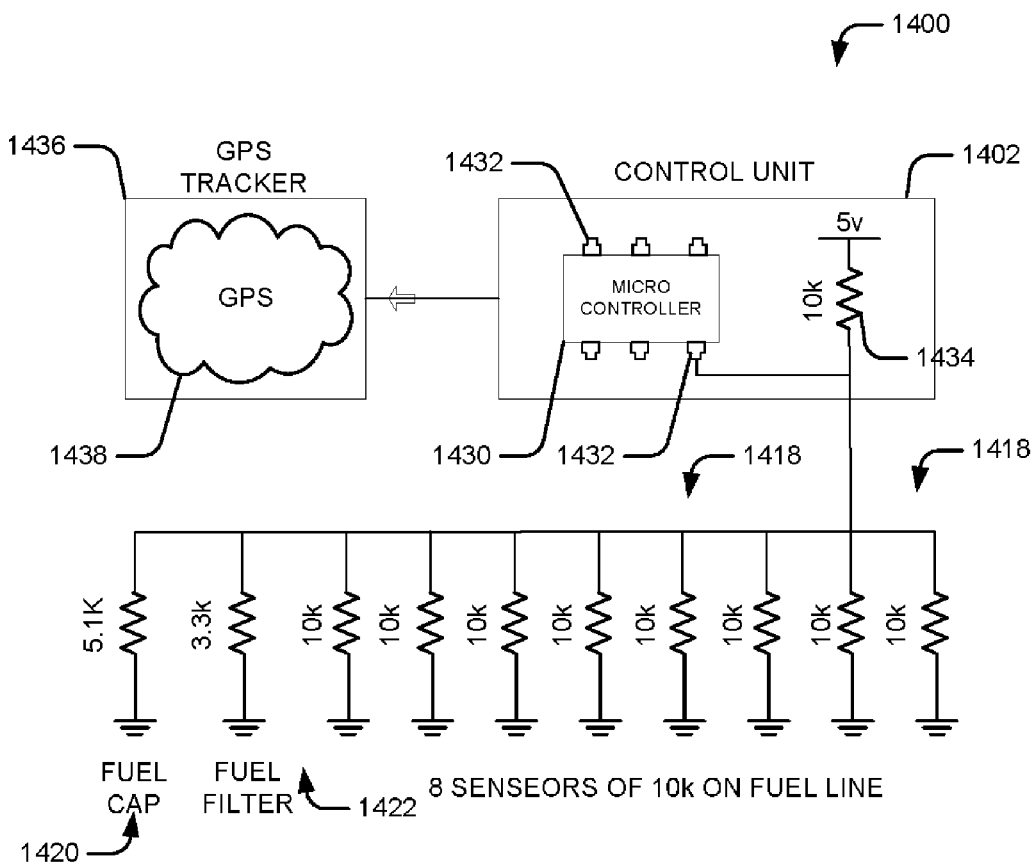
FIG. 14 schematically illustrates a fuel anti-theft system.

FIG. 14 schematically illustrates a fuel anti-theft system. More specifically, FIG. 14 illustrates a fuel anti-theft system 1400, a control unit 1402, line sensors 1418, an identifiable sensor 1420, an identifiable sensor 1422, a microcontroller 1430, jacks 1432, a pull-up resistor 1434, a GPS Tracker 1436, and GPS application 1438. The fuel anti-theft system 1400 of the current embodiment can be used where certain routine activities might appear to be theft-events thereby triggering false alarms. For instance, fuel caps and fuel filters are more routinely opened/replaced than other components in typical fuel systems.

Activations of the fuel cap and fuel filter identifiable sensors 1420 and 1422 are typically more routine than activation of other sensors such as the line sensors 1418. Thus, users might want to respond to activation of the identifiable sensors 1420 and/or 1422 differently than activation of the line sensors 1418 (and/or even each other).

The Fuel anti-theft system 1400 shown in FIG. 14 produces different, identifiable resistance changes as sensed at the input to the control unit 1802. The resistor values used for the fuel cap identifiable sensor 1420 (5.1 kohm) and the fuel filter identifiable sensor 1422 (3.3 kohm) are different from each other and the line sensors 1418 (10 kohm) in the fuel anti-theft system 1400. The control unit 1402 of the current embodiment will detect a unique resistance change value for each sensor type and take appropriate action to notify users of the activation.

Note that these differing resistance changes can be determined with reference to the following equations and/or Table 2. Note also that while the foregoing resistance values were selected to be different enough to produce readily discernible network resistance changes, other resistance values could be used.

$$1/R_{secure} = 1/R_{fuelcap} + 1/R_{fuelfilter} + n*1/R_{fuellinesensor}$$

Where:

$R_{secure}$ is the expected, overall resistance of the sensor network, $R_{fuelfilter}$ is fuel filter sensor resistance (3.3 Kohm)

$R_{fuelcap}$ is fuel cap sensor resistance (5.1 Kohm)

$R_{fuellinesensor}$ is fuel line sensor resistance (10 Kohm)

n is the pre-selected number (usually 8 sensors)

TABLE 1

| Disconnected Sensors(s) | Network resistance (k-ohm) |
| --- | --- |
| None | 0.77 |
| Fuel Cap | 0.9 |
| Fuel Filter | 1.004 |
| 1 Fuel Line | 0.83 |
| 2 Fuel Line | 0.91 |
| 3 Fuel Line | 1 |
| 4 Fuel Line | 1.11 |
| 5 Fuel Line | 1.25 |
| 6 Fuel Line | 1.43 |
| 7 Fuel Line | 1.67 |
| 8 Fuel Line | 2 |

FIG. 14 also illustrates that the microcontroller 1430 (and/or control unit 1802) could include jacks 1432 for convenient connection/disconnection of the various wires, cables, etc. in the system to these devices. In the alternative, or in addition, one or more of these cables could be hardwire to the control unit 1402 and/or microcontroller 1430.

Further still, FIG. 14 also illustrates that the control unit 1402 can pass a signal to the GPS tracker 1436/GPS application 1438 indicative of whether the fuel system appears to be secure, potentially tampered with, or in some routine condition. The GPS application 1438 can be configured to record the location of the fuel system (or vehicle) when that signal changes and/or can send a corresponding message to various users upon such changes. If desired, the GPS application 1438 can be configured to send a more or less continuous signal so that the sensed state of the system is known at all times. Furthermore, the (GPS application can be configured with a user interface (such as, a graphical user interface) which allows users to create their own rules for responding to alerts. For instance, a user could configure the GPS application to automatically disable the ignition circuit of the vehicle if an alert indicates that fuel theft might be occurring (or has occurred).

Figure 15:
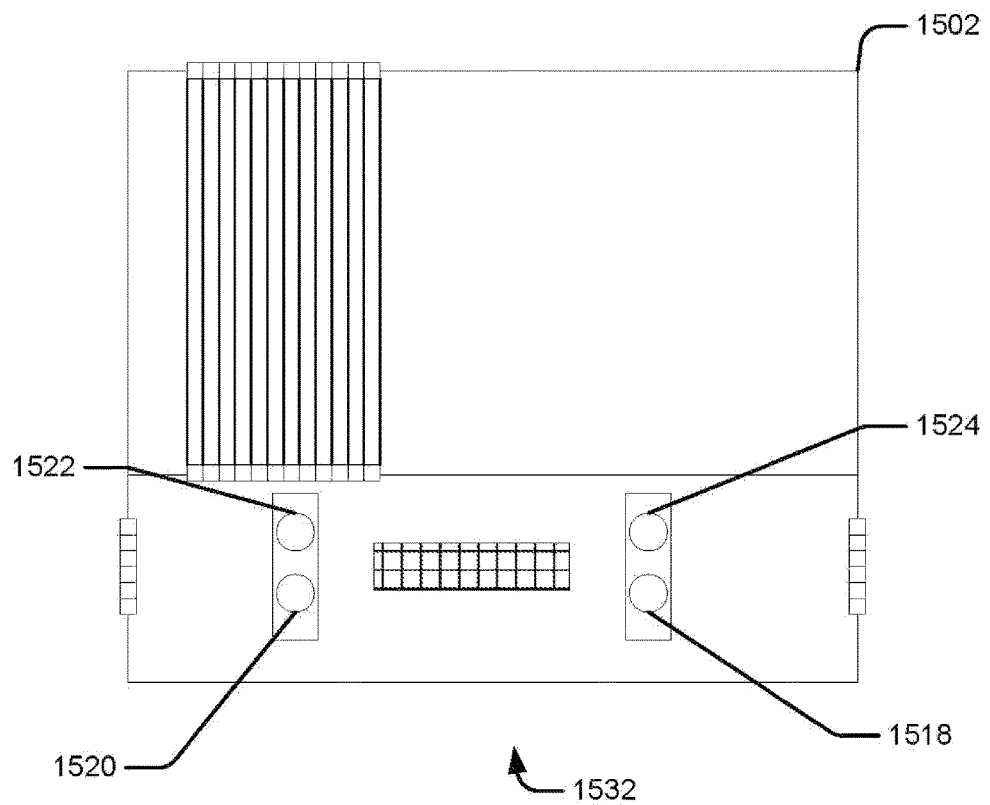
FIG. 15 illustrates a fuel anti-theft control unit.

FIG. 15 illustrates a fuel anti-theft control unit. The fuel anti-theft control unit 1502 of the current embodiment includes a series of jacks 1532 for connecting the sensors of the network to it. It also includes several indicators 1518, 1520, and 1522 corresponding to the line sensors 1518 and identifiable sensors 1520 and 1522. The control unit 1502 can also include an indicator 1926 configured to be activated should more than one sensor be activated.

Figure 16:
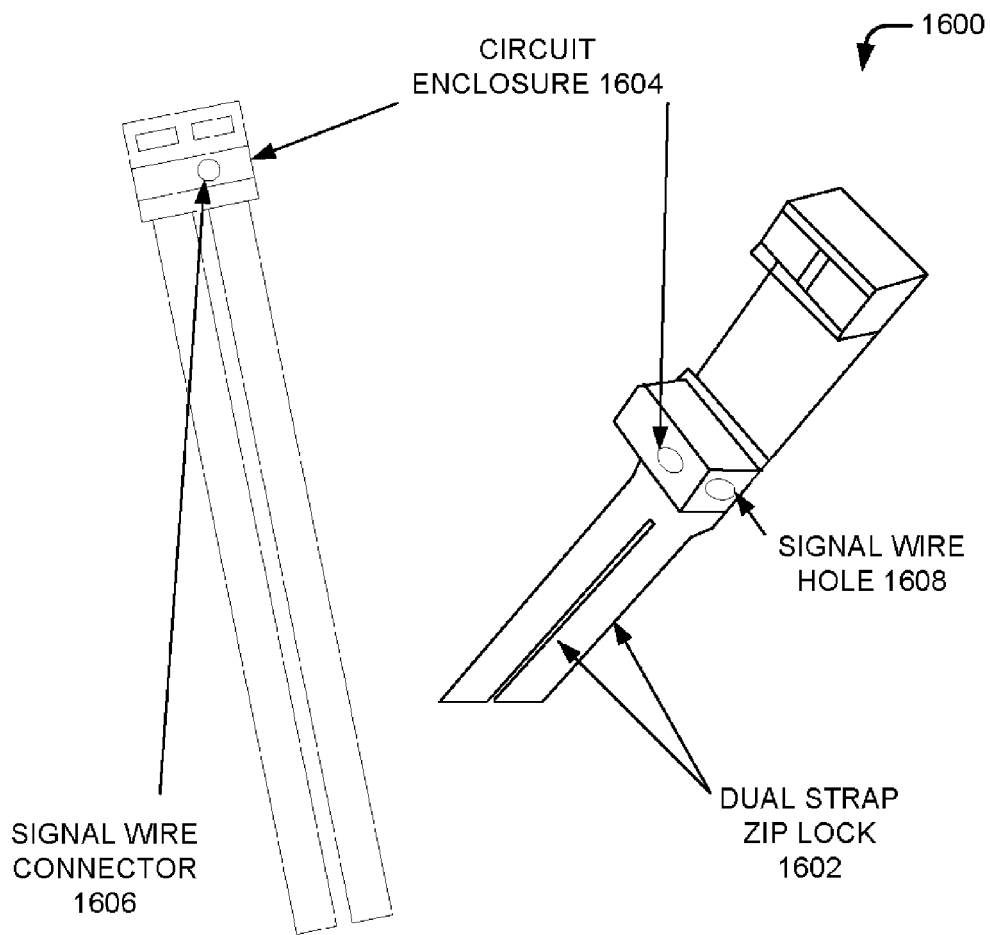
FIGS. 16 and 17 illustrate a fuel line sensor.
Figure 17:
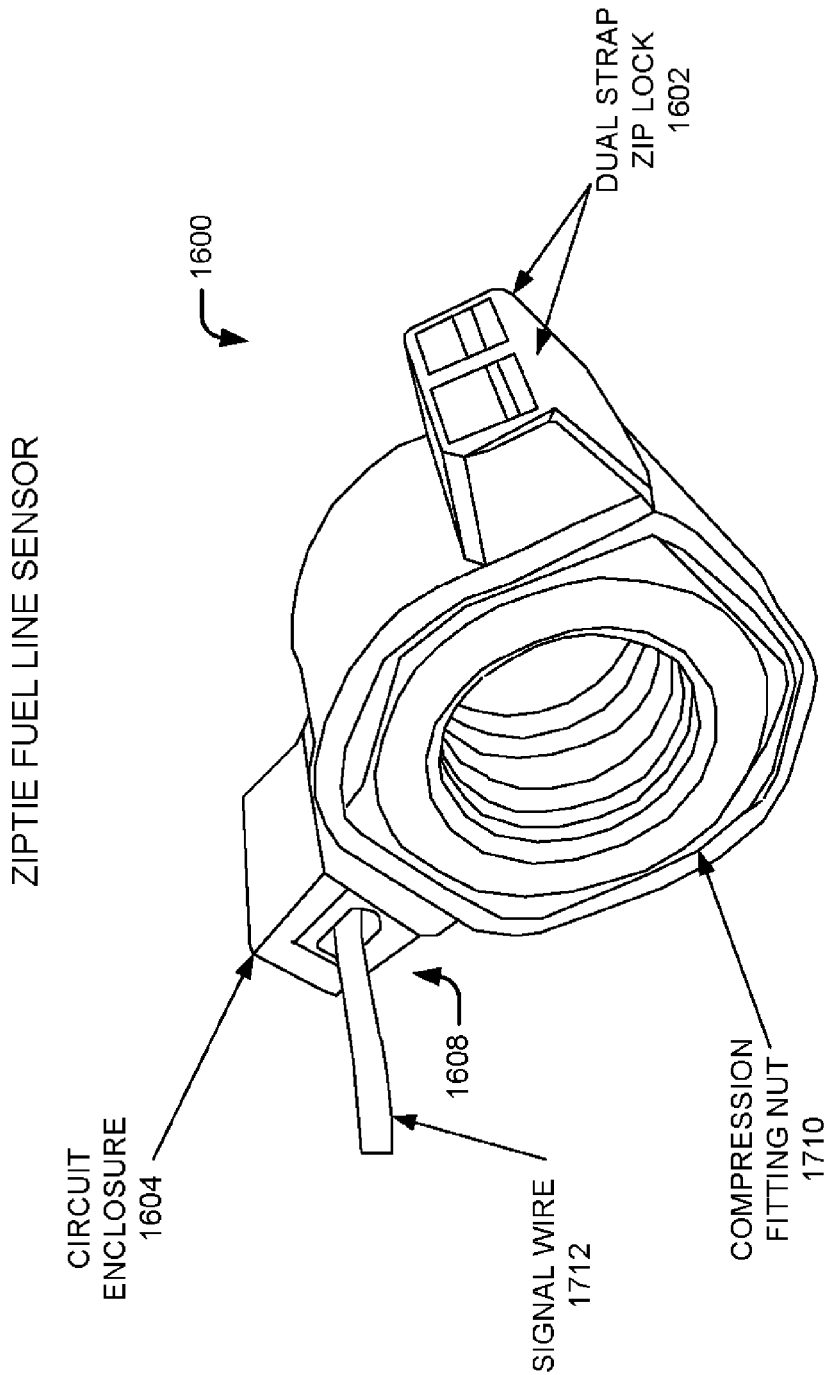

FIGS. 16 and 17 illustrate a fuel line sensor. The fuel line sensor 1600 of the current embodiment can be installed around compression fittings (or other components) on vehicle fuel lines. In the event that the fuel line sensor 1600 is uninstalled to allow access to the fitting (or otherwise tampered with), the internal electrical connection to the vehicle ground will be broken (or destroyed), and the microcontroller of the current embodiment will detect the change of state and will send an alert.

Furthermore. FIG. 16 illustrates that the fuel line sensor 1600 can be secured to various components via a dual strap cable tie 1602 (or cable ties, zip ties, zip locks, etc.). FIG. 16 also shows that the fuel line sensor 1600 also includes a circuit enclosure 1604 and a signal wire connector 1606 and defines a signal wire hole 1608.

While FIG. 16 illustrates the fuel line sensor 1600 in an uninstalled condition, FIG. 17 illustrates it as being installed on a compression fitting nut 1710 and with a signal wire 1712 connected thereto via the signal wire hole 1608/signal wire connector 1606. Note that the dual strap cable tie 1602 has been pulled snug against the compression fitting nut, 1710.

Figure 18:
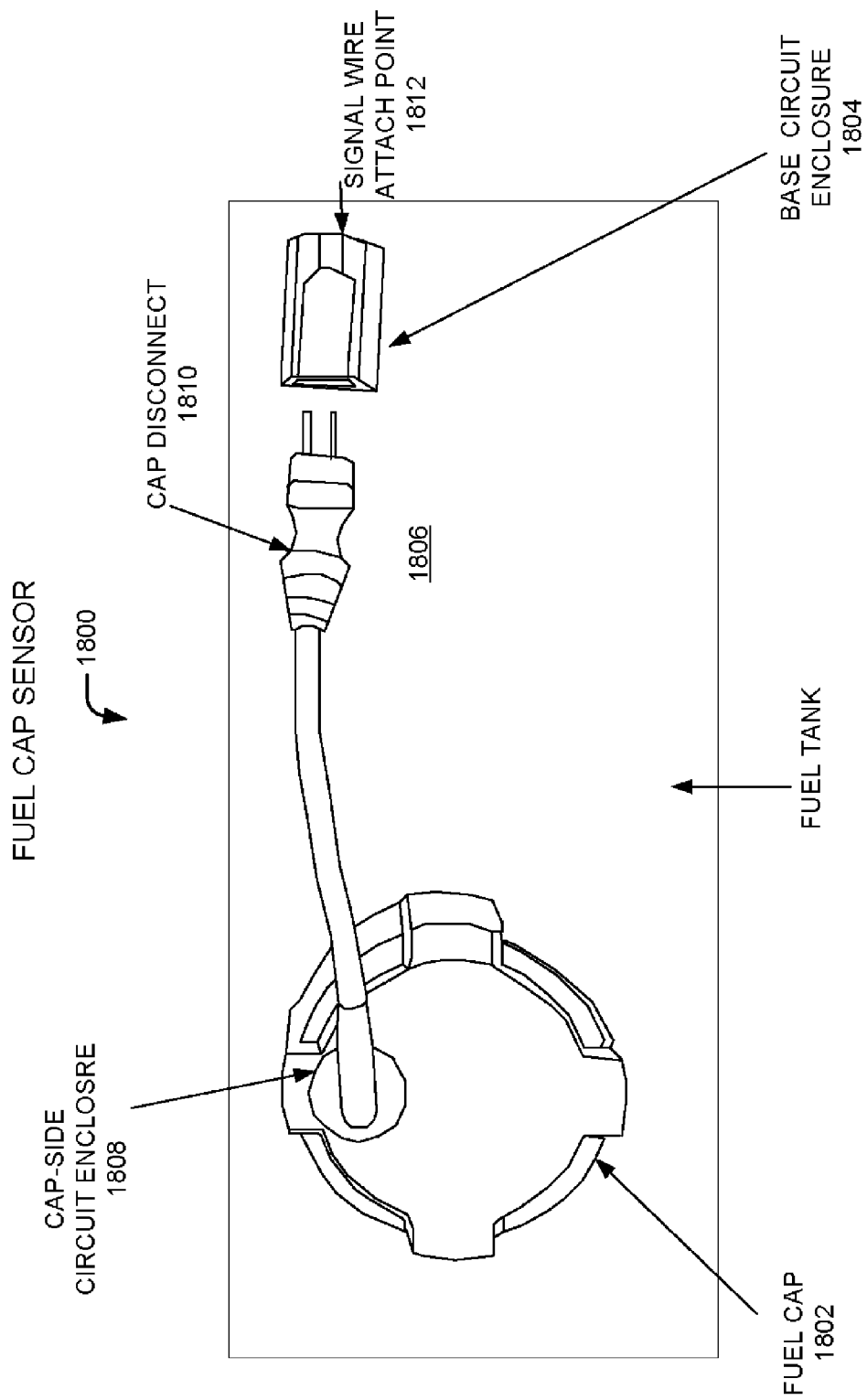
FIG. 18 illustrates a fuel cap sensor.

FIG. 18 illustrates a fuel cap sensor. The fuel cap (identifiable) sensor 1800 of the current embodiment can be installed on various fuel caps. The fuel cap sensor 1800 can be secured to the fuel cap 1802 via an adhesive while the circuit enclosure 1804 can be secured to the fuel tank 1806 by an adhesive too. In the event that the fuel cap sensor 1800 is unplugged to allow access to the fuel tank 1806, the circuit for that sensor is broken and an alert is sent. When the fuel cap sensor 1800 is uninstalled (or removed by force or otherwise tampered with) it destroys its electrical connection to the vehicle ground. The microcontroller of the current embodiment detects the change of state and an alert is sent.

Note that FIG. 18 also illustrates a cap-side circuit enclosure 1808 and the two halves of a quick disconnect 1810 of the fuel cap sensor 1800. Further, the tank-side or base circuit enclosure 1804 defines or includes a signal wire attachment point 1812.

Embodiments provide fuel anti-theft systems, sensors, controllers, etc. which allow for the monitoring of vehicle fuel systems for potential tampering and/or fuel theft. Some such systems allow for discreet, unobtrusive, and potentially unsuspected fuel system monitoring. In some embodiments, the sensors, controllers, systems, etc. are reliable, rugged, and relatively inexpensive to install and/or operate. Systems of some embodiments allow users to investigate potential fuel-theft events remotely and to implement corrective actions.

CONCLUSION

Although the subject matter has been disclosed in language specific to structural features and/or methodological acts, it is to be understood that the subject matter defined in the appended claims is not necessarily limited to the specific features or acts disclosed above. Rather, the specific features and acts described herein are disclosed as illustrative implementations of the claims.

What is claimed is:

1. A fuel anti-theft system for a vehicle possessing a fuel system further compressing a plurality of fluid entry points, the fuel anti-theft system comprising:
    a plurality of sensors of a pre-selected number positioned on a corresponding number of the fluid entry points, each sensor defining a secure state and a potentially tampered-with state, the potentially tampered-with state indicative of the sensor being absent, wherein actual states of the sensors combine to create an actual combined state of the sensors, the secure states of the pre-selected number of sensors combining to create a combined secure state of the pre-selected number of sensors;
    a controller in electrical communication with the sensors and being configured to sense the actual combined state of the sensors and to determine whether the actual combined state of the sensors is the combined secure state of the pre-selected number of sensors and to generate a signal responsive thereto whereby the signal indicates whether all of the pre-selected number of sensors are secure; and
    an output configured to output the signal indicative of whether all of the pre-selected number of sensors are secure.

2. The system of claim 1 wherein the controller is further configured to sense the combined secure state of the sensors via a chassis ground of a vehicle on which the controller is configured to be mounted.

3. The system of claim 1 wherein the controller is further configured to sense the combined secure state of the sensors when they are in parallel electrical communication with one another.

4. The system of claim 1 further comprising a resistor possessing a resistance sufficiently equal to a resistance of a particular sensor in the secure sensor state to emulate the particular sensor.

5. The system of claim 1 further comprising a geo-positioning unit in electrical communication with the output.

6. The system of claim 1 wherein at least one of the sensors further comprises a normally open switch and a clamp, the clamp being positioned relative to the switch to close the switch when the clamp moves to a clamped position.

7. The system of claim 1 wherein at least one of the sensors further comprises a grounding strap.

8. The system of claim 1 wherein at least one of the sensors further comprises a ground return lead.

9. The system of claim 1 wherein one of the sensors is configured to be positioned at a fuel cap of the vehicle.

10. The system of claim 1 wherein one of the sensors is configured to be positioned at a fuel filter of the vehicle.

11. A method comprising:
    sensing a combined signal from a plurality of sensors positioned at entry points of a vehicle fuel system wherein each sensor defines a secure state and a suspect state indicative of the sensor being absent and wherein the secure sensor states of a pre-selected number of sensors nominally in the system combine to create a secure system state signal;
    determining whether a sensed, actual combined signal is the secure system state signal for the pre-selected number of sensors; and
    responsive to the determining, outputting a signal indicative of whether the sensed, actual combined signal is the secure system state signal for the pre-selected number of sensors.

12. The method of claim 11 wherein the sensing of the combined signal is via a vehicle chassis ground.

13. The method of claim 11 wherein the sensors are nominally wired in parallel with one another.

14. The method of claim 11 wherein a resistor contributes to the combined signal.

15. The method of claim 11 further comprising noting a location of a vehicle when the combined signal is not the secure system state signal for the pre-selected number of sensors.

16. A fuel anti-theft controller comprising:
    an input configured to electrically communicate with a plurality of sensors configured to be positioned at entry points of a vehicle fuel system and defining a nominal state and a potentially tampered-with state indicative of at least one of the sensors being absent;
    a circuit in electrical communication with the input and being configured to sense a combined state of the sensors and to determine whether the combined state of the sensors indicates that all of a pre-selected number of the sensors are present and secure; and
    an output in electrical communication with the circuit and being configured to output a signal indicative of whether all of the pre-selected number of the sensors are present and secure.

17. The controller of claim 16 wherein the controller is further configured to sense the combined state of the sensors via a chassis ground of a vehicle on which the controller is configured to be mounted.

18. The controller of claim 16 wherein the controller is further configured to sense the combined state of the sensors when they are in parallel communication with one another.

19. The controller of claim 16 further comprising a resistor possessing a resistance sufficiently equal to a resistance of a particular sensor in the nominal sensor state to emulate the particular sensor.

20. The controller of claim 16 further comprising a geo-positioning unit in electrical communication with the output.

* * * * *